United States Patent
Nonaka

(10) Patent No.: US 9,535,387 B2
(45) Date of Patent: Jan. 3, 2017

(54) PRINTING SYSTEM, PRINTING APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Takashi Nonaka, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/539,702

(22) Filed: Nov. 12, 2014

(65) Prior Publication Data

US 2015/0147073 A1 May 28, 2015

(30) Foreign Application Priority Data

Nov. 28, 2013 (JP) ................. 2013-246674

(51) Int. Cl.
| | |
|---|---|
| G03G 15/00 | (2006.01) |
| G06F 3/00 | (2006.01) |
| G06K 15/02 | (2006.01) |
| G06F 3/12 | (2006.01) |
| G06K 15/00 | (2006.01) |

(52) U.S. Cl.
CPC ........ *G03G 15/5012* (2013.01); *G03G 15/502* (2013.01); *G03G 2215/00548* (2013.01); *G03G 2215/00814* (2013.01); *G06F 3/1234* (2013.01); *G06F 3/1261* (2013.01); *G06K 15/4085* (2013.01)

(58) Field of Classification Search
CPC .. G06F 3/1234; G06F 3/1261; G06K 15/4085; G03G 15/5012
See application file for complete search history.

(56) References Cited

FOREIGN PATENT DOCUMENTS

| JP | 2000-318245 A | 11/2000 |
|---|---|---|
| JP | 2007-83557 A | 4/2007 |

*Primary Examiner* — Laura Martin
*Assistant Examiner* — John M Royston
(74) *Attorney, Agent, or Firm* — Fitzpatrick, Cella, Harper & Scinto

(57) ABSTRACT

If a sheet is jammed while conveyed, whether the jammed sheet and a sheet preceding the jammed sheet have been generated by cutting an uncut sheet from which the jammed sheet is derived is determined. If generated, a printing apparatus re-prints a plurality of images including an image of the jammed sheet on a sheet, and the cutting apparatus cuts the re-printed sheet. If the jammed sheet and the preceding sheet have been generated, the printing apparatus re-prints a plurality of images including an image of the jammed sheet on a sheet, the cutting apparatus cuts the re-printed sheet, and a sheet that includes the same image as the preceding sheet is discharged to a different discharge destination from that of the preceding sheet.

15 Claims, 15 Drawing Sheets

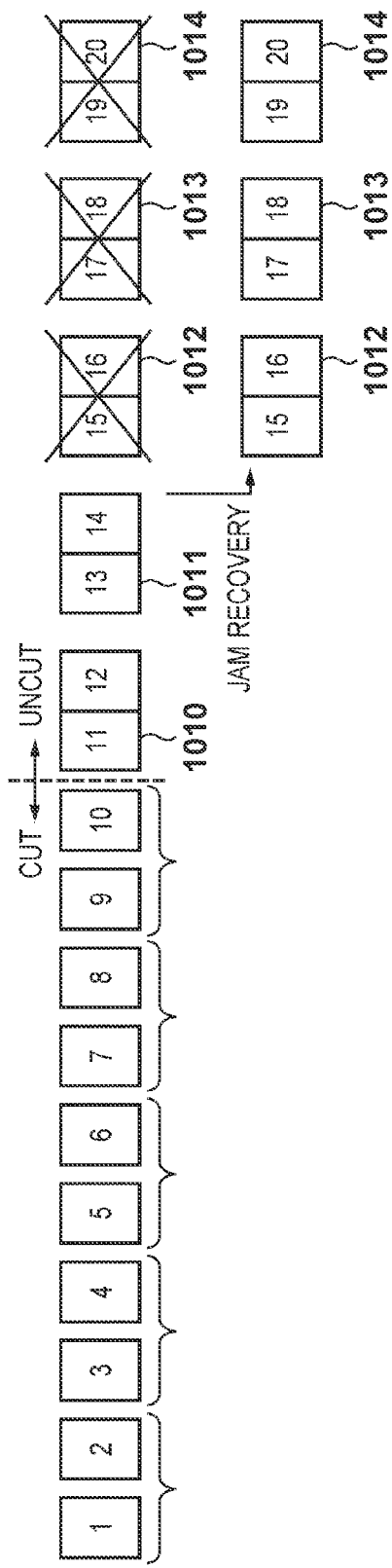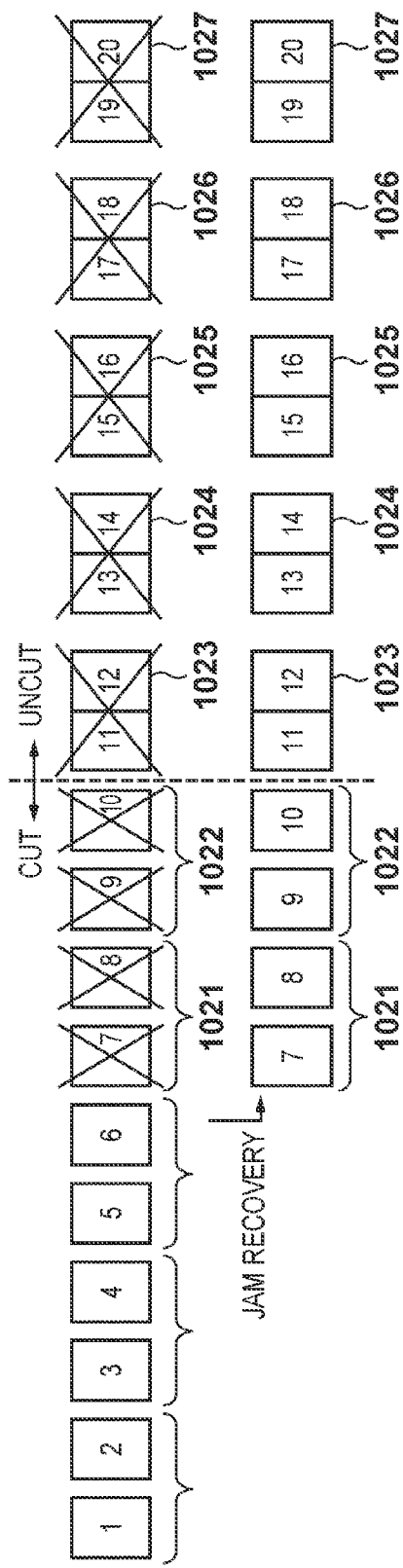

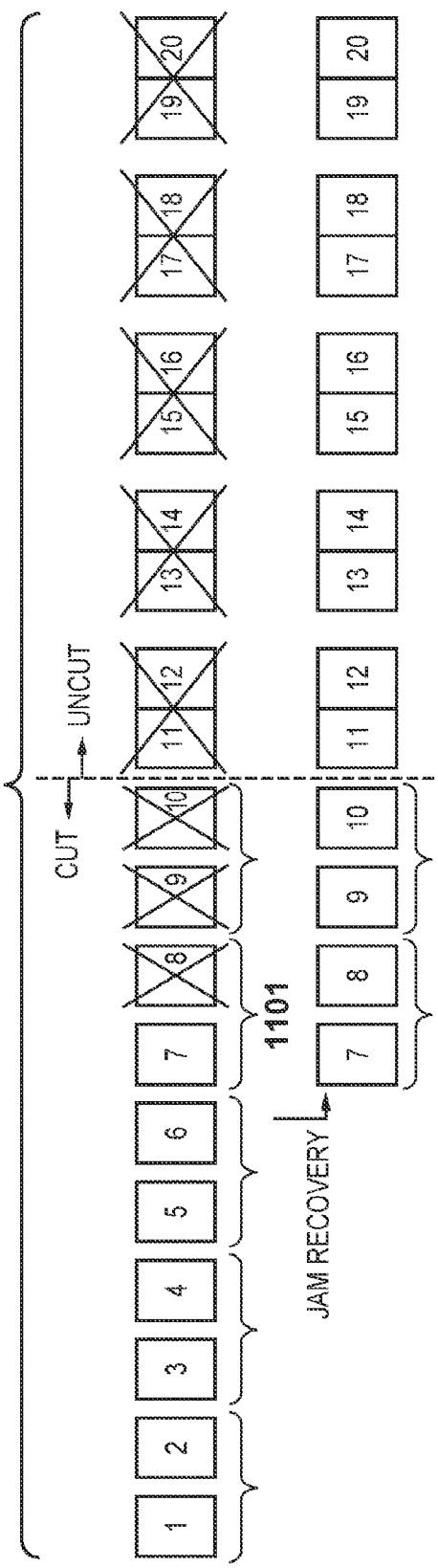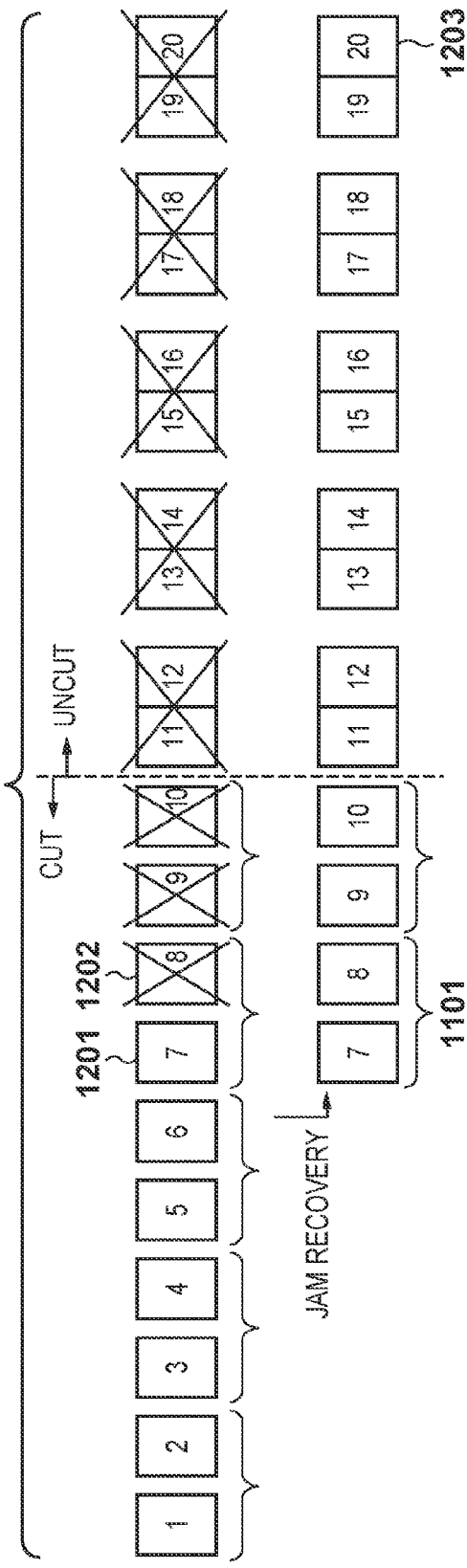

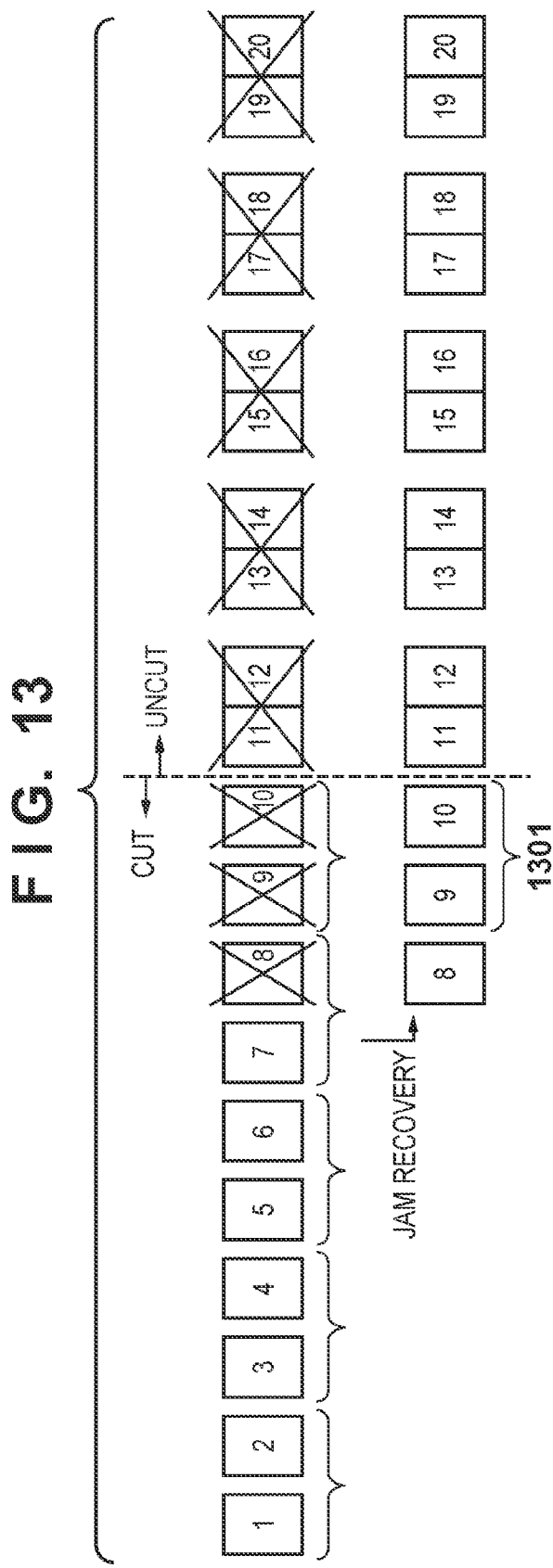

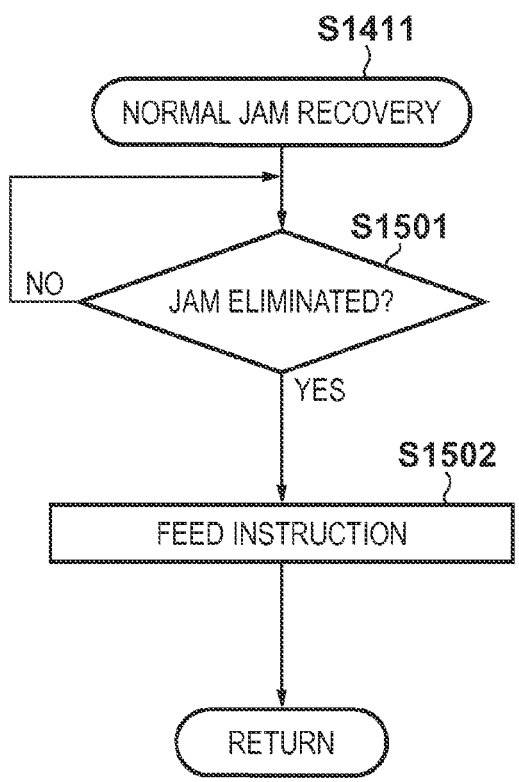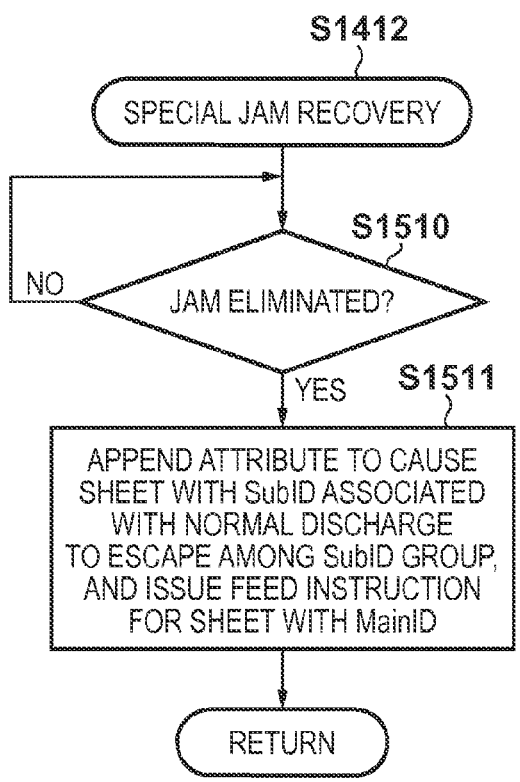

PRINTING SYSTEM, PRINTING APPARATUS, CONTROL METHOD THEREFOR, AND STORAGE MEDIUM STORING PROGRAM

BACKGROUND OF THE INVENTION

Field of the Invention

The present invention relates to a printing system, a printing apparatus, a control method therefor, and a storage medium storing a program.

Description of the Related Art

In a printing market, there is a printing system that produces final products by applying various post-processes to printed sheets. One example of such post-processes is a cutting process, and a printing system is known that feeds a belt-like sheet such as a roll of paper, performs printing on the sheet, and cuts the sheet to a predetermined length. Also, as a printing system that feeds and performs printing on cut sheets and the like, a printing system is known that creates products by printing a plurality of images laid out on one sheet and then cutting the sheet with a post-process apparatus. For example, there is a function called double copy for printing a plurality of copies of A4-size sheets; in this double copy, two identical images are laid out and printed on an A3-size sheet, and then the A3-size sheet is cut to A4 size, that is to say, two copies of printed A4-size sheets are obtained. As the price of one A3-size sheet is lower than the price of two A4-size sheets in general, the use of the double copy function leads to cost reduction and improvement in productivity. Meanwhile, as a cutting apparatus that cuts sheets printed through double copy is generally arranged in the final stage of an entire printing system and completes discharge immediately after sheets are cut, it has a relatively small risk of sheet jam such as clogging of sheets.

Japanese Patent Laid-Open No. 2000-318245 describes a method of controlling a length to which a belt-like sheet is cut by a printing apparatus that prints an image on the sheet, cuts the sheet after the printing, and conveys the cut sheet to the outside of the apparatus. On the other hand, Japanese Patent Laid-Open No. 2007-83557 describes an image forming method for the case of double copy; in this method, upon issuance of an instruction for printing a plurality of copies, printing is performed through double copy, and if the number of the copies is an odd number, the last image is laid out and printed on the last sheet together with a blank image.

However, conventionally, no thought is given to a method of recovery from a sheet jam that occurs during the execution of a job in which a sheet printed using a double copy function is cut and conveyed. For example, after a sheet is cut in half, if one of the two cut sheets located upstream in a conveyance direction is jammed, the other sheet located downstream in the conveyance direction can be discharged normally because a conveyance path is not blocked by the jammed sheet located upstream. Then, recovery is performed in the following procedure: after the jammed sheet located upstream in the conveyance direction is removed, an A3-size sheet is fed again, and an image is printed on the fed sheet. In this case, as shown in FIG. 11, an image of the sheet located downstream in the conveyance direction, i.e., the sheet that has been discharged normally, is printed again on the fed sheet; in other words, a printed material is output in a redundant manner.

FIG. 11 is a diagram for describing a problem discussed in the present invention.

This is a case in which a cut sheet on which an image 8 has been printed, as well as subsequent sheets, is jammed. Prior to the cutting, a pair of images 7 and 8 was printed on an A3-size sheet 1101. After the sheet 1101 is cut, an A4-size sheet on which the image 7 has been printed is discharged normally, but a subsequent A4-size sheet on which the image 8 has been printed is jammed. In this case, one of the two images that were printed on the same sheet 1101 prior to the cutting is printed on the jammed sheet. Here, if recovery from the jam is performed through conventional control, a printing process for the A3-size sheet 1101 is restarted. This results in creation of two A4-size sheets on which the image 7 has been printed, that is to say, image redundancy.

SUMMARY OF THE INVENTION

An aspect of the present invention is to eliminate the above-mentioned problem with the conventional technology.

The present invention provides a technique to enable recovery from jamming of a cut sheet without image redundancy in a case where a plurality of images are printed on the same sheet and the sheet is cut to obtain a plurality of sheets on which the same image has been printed.

The present invention in one aspect provides a printing system including a printing apparatus and a cutting apparatus, the cutting apparatus receiving and cutting a printed sheet on which a plurality of images have been printed by the printing apparatus, the printing system comprising: a conveyance unit configured to convey a plurality of sheets that have been cut by the cutting apparatus and that each include one of the plurality of images; a determination unit configured to, in a case where a sheet is jammed while being conveyed by the conveyance unit, determine whether or not the jammed sheet and a sheet preceding the jammed sheet have been generated by cutting an uncut sheet from which the jammed sheet is derived; and a control unit configured to in a case where the determination unit determines that the jammed sheet and the preceding sheet have not been generated by cutting the uncut sheet, perform control such that the printing apparatus re-prints a plurality of images including an image of the jammed sheet on a sheet having a same size as the uncut sheet, and the cutting apparatus cuts the re-printed sheet, and in a case where the determination unit determines that the jammed sheet and the preceding sheet have been generated by cutting the uncut sheet, perform control such that the printing apparatus re-prints a plurality of images including an image of the jammed sheet on a sheet having a same size as the uncut sheet, the cutting apparatus cuts the re-printed sheet, and a sheet that results from the cutting and includes a same image as the preceding sheet is discharged to a discharge destination different from a discharge destination of the preceding sheet.

According to the present invention, recovery from jamming of a cut sheet can be performed without image redundancy in a case where a plurality of images are printed on one sheet and the sheet is cut to obtain a plurality of sheets on which the same image has been printed.

Further features of the present invention will become apparent from the following description of exemplary embodiments with reference to the attached drawings.

BRIEF DESCRIPTION OF THE DRAWINGS

FIGS. 10A and 10B are diagrams for describing examples of recovery from a jam.

FIG. 11 is a diagram for describing a problem.

FIG. 12 is a diagram for describing processing.

FIG. 13 is a diagram for describing another jam recovery control.

FIG. 15A is a flowchart for describing a normal jam recovery process of step S1411, and FIG. 15B is a flowchart for describing a special jam recovery process of step S1412.

DESCRIPTION OF THE EMBODIMENTS

Figure 1A:
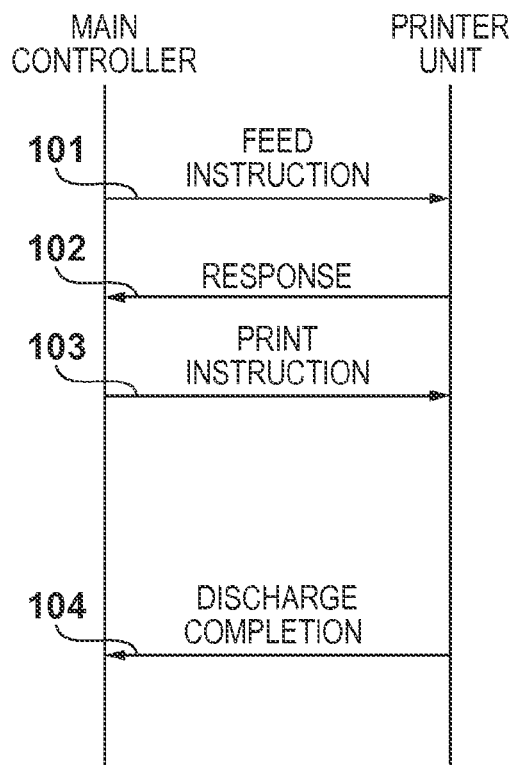
FIGS. 1A and 1B are sequence diagrams for describing the operations of a main controller, which manages the statuses of sheets before and after the sheets are cut, and a printer unit in a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problem according to the present invention. The same constituent elements are given the same reference numeral to omit the description.

Figure 1B:
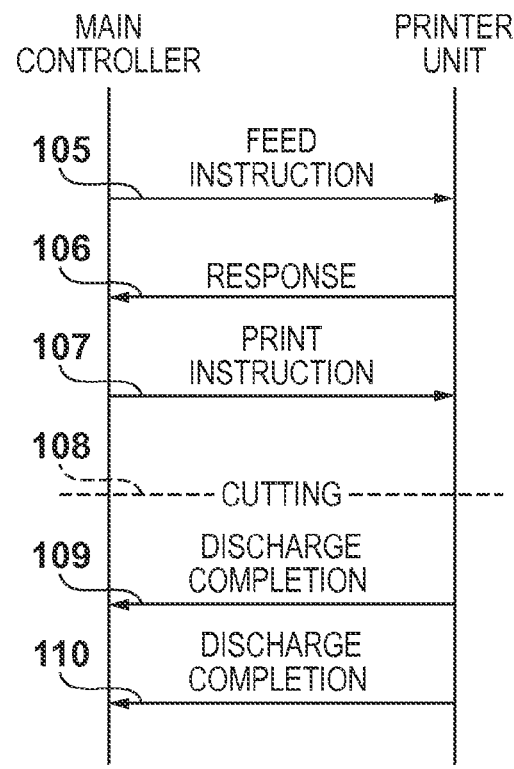

FIGS. 1A and 1B are sequence diagrams for describing the operations of a main controller, which manages the statuses of sheets before and after the sheets are cut, and a printer unit in a printing system according to the present embodiments. FIGS. 1A and 1B will be described first, and the printing system according to the embodiments including the main controller, the printer unit, and the like will be described later with reference to FIGS. 2A to 2C, 3, and 4.

FIG. 1A shows a basic sequence diagram in which the main controller that controls the entire printing system according to the embodiments instructs the printer unit that controls printing and post-process apparatuses to perform printing, and the printer unit prints images on sheets and discharges the sheets.

First, the main controller sends a feed instruction 101 to the printer unit. This feed instruction 101 includes, for example, settings related to a feeder that feeds sheets and post-processes applied to printed sheets. These settings also include setting about whether or not to cut sheets, and attributes such as the number of times the sheets are cut and positions at which the sheets are cut if the sheets are to be cut. Upon receiving this feed instruction 101, the printer unit executes a process for picking up sheets from a feeding unit, and transmits, to the main controller, a response 102 indicating that a feeding process associated with the feed instruction 101 has been executed. Next, the main controller transfers a print instruction 103 to the printer unit in accordance with this response 102. This print instruction 103 includes image data, a color mode, an image size, and the like of a print target. Upon receiving this print instruction 103, the printer unit prints images on sheets that have been fed, and performs control such that the sheets are discharged to the outside of the apparatuses after post-processes are applied to the sheets. Once the sheets have been discharged this way, the printer unit notifies the main controller of discharge completion 104, and the processes are ended. This is the end of the basic sequence.

FIG. 1B shows a sequence diagram in which the main controller that controls the entire printing system according to the embodiments instructs the printer unit that controls printing and post-process apparatuses to perform printing, and sheets are discharged after the printer unit prints images on the sheets and the sheets are cut.

The main controller sends a feed instruction 105 to the printer unit. It is assumed that the number of times sheets are cut (for example, "1") is designated in this feed instruction 105. After the printer unit transmits a response 106 thereto, processes that are the same as those from the response 102 to the print instruction 103 of FIG. 1A are executed until printing is performed as a result of subsequent transmission of a print instruction 107 from the main controller to the printer unit.

Next, the printer unit causes a cutting apparatus to apply a cutting process 108 to the printed sheets for which the feed instruction 105 has been issued. Two sheets that have been cut in this cutting process are conveyed to a subsequent stage. Thereafter, when the first one of the cut sheets has been discharged to the outside of the apparatuses, the printer unit notifies the main controller of discharge completion 109 indicating that discharge of the first one of the cut sheets has been completed. Then, when the second one of the cut sheets has been discharged to the outside of the apparatuses, the main controller is notified of discharge completion 110 indicating that discharge of the second one of the cut sheets has been completed. Here, if a jam occurs, the printer unit can notify the main controller of abnormal discharge by including information to that effect in the discharge completions 109, 110. In this way, the main controller can manage whether or not discharge of cut sheets has been completed normally, or whether or not discharge of cut sheets is being suspended due to a jam and the like, on a sheet-by-sheet basis. A specific method of managing information will be described later with reference to FIGS. 8A and 8B. Recovery control for performing recovery from a jam using such information will be described later with reference to FIGS. 12 and 13.

Figure 2A:
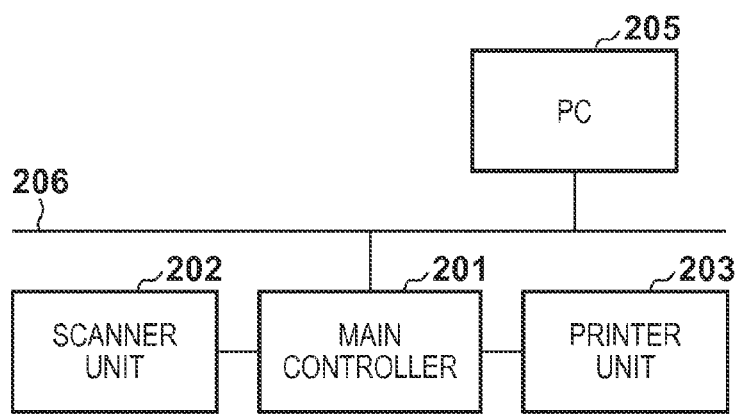
FIGS. 2A to 2C are diagrams for describing the printing system.
Figure 2B:
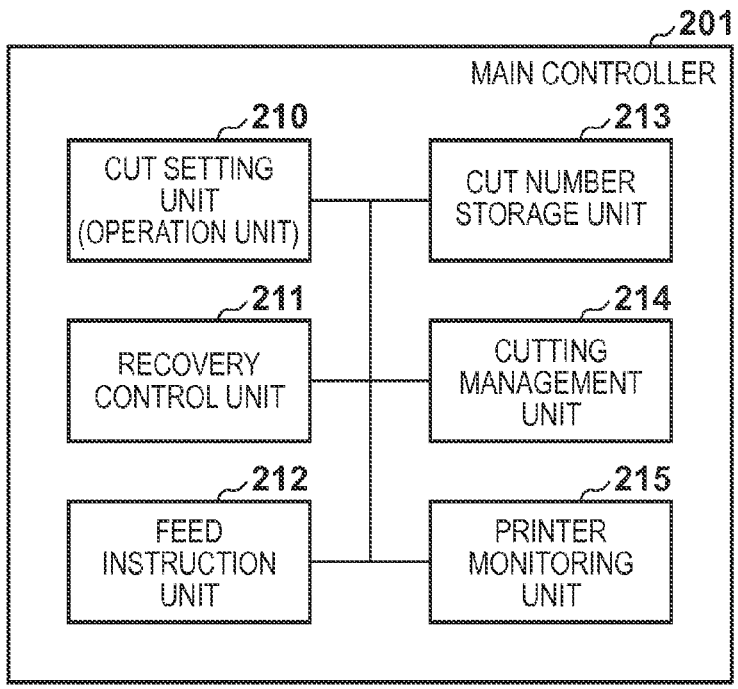
Figure 2C:
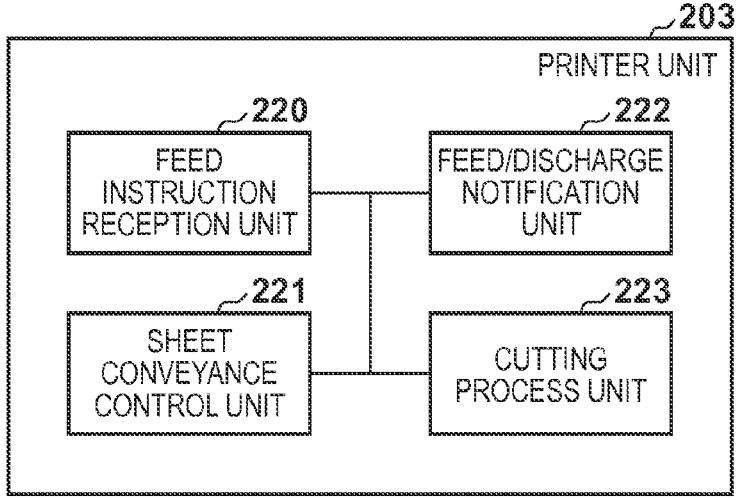

FIGS. 2A to 2C are diagrams for describing the printing system according to the present embodiments.

FIG. 2A shows an overall configuration of the printing system according to the embodiments.

This printing system includes a main controller 201 that controls the operations of the entire printing system, a scanner unit 202 that generates image data by reading a document, and a printer unit 203 that controls printing of images and post-processes. The main controller 201 is connected to a PC 205 via a network 206. The PC 205 can input a job to the main controller 201 using a printer driver and the like.

FIG. 2B is a block diagram for describing a functional configuration of the main controller 201 according to the embodiments.

A cut setting unit 210 sets whether or not to cut printed sheets, as well as the number of times the sheets are cut and positions at which the sheets are cut if the sheets are to be cut. A cut setting process of this cut setting unit 210 will be described later in detail, with reference to FIG. 7. The number of times the sheets are cut, which is set by the cut setting unit 210, is stored into a cut number storage unit 213. A cutting process is executed in accordance with the number stored in the cut number storage unit 213. A cutting management unit 214 manages sheets before and after the cutting. Management information that is managed thereby will be described later in detail, with reference to FIGS. 8A and 8B. A feed instruction unit 212 issues an instruction for feeding sheets to be printed. This corresponds to the feed instructions 101, 105 of FIGS. 1A and 1B. A printer monitoring unit 215 monitors the status of the printer unit 203 by way of reception of the responses 102, 106 indicating that sheets have been fed and the discharge completions 104, 109, 110, which are shown in FIGS. 1A and 1B. If, for example, a sheet jam has occurred in the printer unit 203, a recovery control unit 211 performs recovery control based on information retained in the cutting management unit 214.

FIG. 2C is a block diagram for describing a functional configuration of the printer unit 203 according to the embodiments.

A feed instruction reception unit 220 receives a feed instruction transmitted from the feed instruction unit 212 of the main controller. A sheet conveyance control unit 221 controls conveyance of sheets in accordance with the feed instruction received by the feed instruction reception unit 220. A feed/discharge notification unit 222 notifies the main controller 201 of the statuses of sheets in accordance with a sheet conveyance process. For example, it notifies the printer monitoring unit 215 of the responses 102, 106 when sheets have been fed in accordance with the feed instruction. It also notifies the printer monitoring unit 215 in the main controller 201 of discharge completion when discharge of sheets has been completed. If a cutting process is set in the feed instruction received by the feed instruction reception unit 220, a cutting process unit 223 instructs the cutting apparatus to cut printed sheets.

Figure 3:
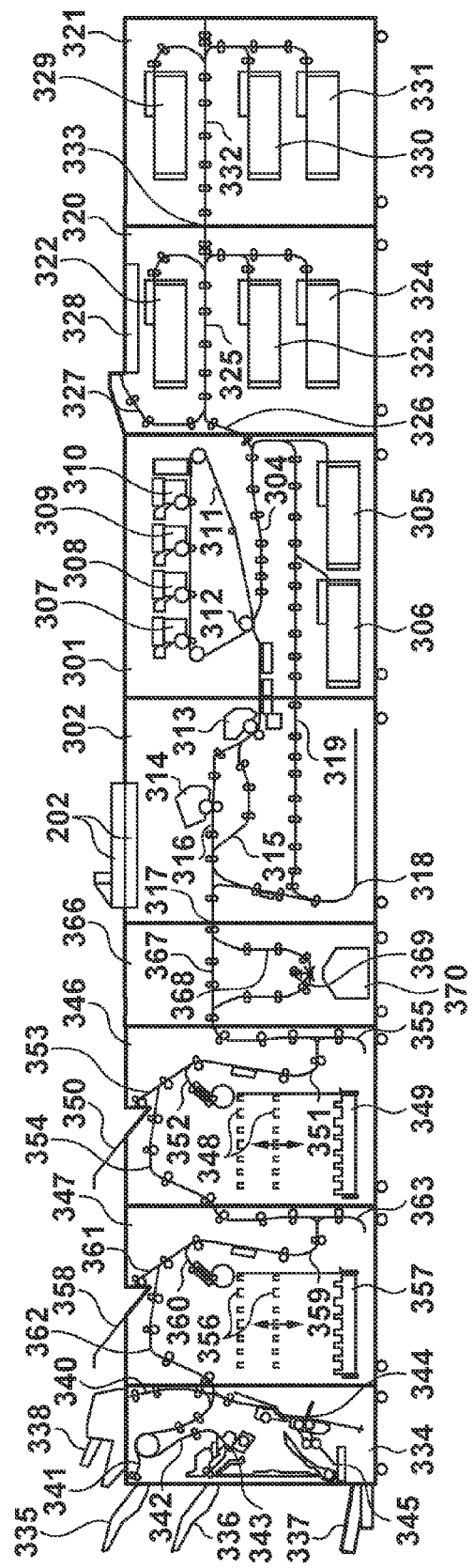
FIG. 3 is a cross-sectional diagram for describing a configuration of the printing system.

FIG. 3 is a cross-sectional diagram for describing the configuration of the printing system according to the embodiments.

This printing system includes a printer engine of a printing apparatus 301 and a fixing apparatus 302 that correspond to the printer unit 203 of FIG. 2, high-capacity feeding decks 320, 321, and high-capacity stackers 346, 347 and a finisher 334 that are post-process apparatuses. The printing apparatus 301 and the fixing apparatus 302 print images on sheets.

The printing apparatus 301 includes feeding decks 305, 306 that operate as standard feeding units. Development units 307 to 310 include four toner image forming units corresponding to Y (yellow), M (magenta), C (cyan), and K (black) for printing color images. Images formed by the development units 307 to 310 are transferred onto an intermediate transfer belt 311 that rotates in a clockwise direction as primary transfer, and transferred onto a sheet that has been conveyed along a sheet conveyance path 304 at a secondary transfer position 312. Images that have been transferred onto the sheet this way are sent from the printing apparatus 301 to the fixing apparatus 302, and fixed onto the sheet by heat and pressure in a fixer 313. The sheet that has passed the fixer 313 is conveyed to a discharge outlet 317 via a conveyance path 315. If it is necessary to fix the images with more heat and pressure depending on the type of the sheet, the sheet that has passed the fixer 313 is conveyed to a second fixer 314 via an upper conveyance path, additional heat and pressure are applied to the sheet, and then the sheet is conveyed to the discharge outlet 317 via a conveyance path 316. In the case of duplex printing, after the sheet with the fixed images is reversed by being sent to a reversing path 318, the sheet is fed again via a duplex conveyance path 319, and printing is performed on the second side of the sheet at the secondary transfer position 312.

Sheets printed in the printing apparatus 301 are fed not only from the feeding units 305, 306, but also from feeding decks 322, 323, 324 in the high-capacity feeding deck 320. Sheets fed from the high-capacity feeding deck 320 are sent to the printing apparatus 301 via sheet conveyance paths 325, 326, and then printed. In a case where the second high-capacity feeding deck 321 is connected, sheets can be fed also from feeding decks 329, 330, 331 in three levels, and sheets conveyed via a sheet conveyance path 332 are passed to the first high-capacity feeding deck 320 at a discharge outlet 333. These high-capacity feeding decks 320, 321 have a function of detecting multi-feed, that is to say, conveyance of a plurality of sheets in a stacked state. If multi-feed is detected, a sheet conveyance path is switched to a conveyance path 327 that is different from the normal conveyance path 326, and sheets involved in multi-feed are discharged to an escape tray 328.

The high-capacity stacker 346, which is one of the post-process apparatuses, will now be described. The high-capacity stacker 346 includes two output destinations as trays to which sheets are output: a discharge tray 350, and a stack unit that includes a lift table 348 and an eject table 349. Sheets that are output in a redundant manner at the time of recovery from a jam are discharged to the discharge tray 350. When sheets have been sent to the high-capacity stacker 346 after the fixing apparatus 302 completed printing on the sheets and a cutting apparatus 366 cut the sheets, the sheets are loaded on the lift table 348 of the stack unit via sheet conveyance paths 351 and 352 in this order. These sheets are obtained by cutting a single uncut sheet into a plurality of sheets of a smaller size, and are consecutively conveyed to the high-capacity stacker 346 in a unit of a single uncut sheet. In a state where no stack of sheets is loaded on the lift table 348, the lift table 348 is located at an upper position as shown in the figure. As loading of a stack of sheets progresses, the lift table 348 is lowered in proportion to the height of the stack of sheets, and control is performed such that the topmost position of the loaded sheets is always at a constant height. When loading of the stack of sheets on the lift table 348 is completed or when the lift table 348 is fully loaded, the table is lowered to the position of the eject table 349, and the stack of sheets is transported to the eject table 349. In order to discharge sheets to the discharge tray 350, the sheets are conveyed to the discharge tray 350 via sheet conveyance paths 351 and 353 in this order. In order to convey sheets to a post-process apparatus subsequent to the high-capacity stacker 346, the sheets are conveyed to the second high-capacity stacker 347 or to the finisher 334 via a sheet conveyance path 354. A reversing unit 355 is a mechanism to reverse the front and back of a sheet, and this reversing unit 355 is basically controlled such that the front and back of a sheet that has been input to the high-capacity stacker 346 at the discharge outlet 317 are the same as the front and back of the sheet at a discharge destination. Beyond the reversing unit 355 is an escape unit; conveyable sheets can be conveyed to the escape unit in the case of abnormal operations such as a jam and error.

It should be noted that the second high-capacity stacker 347 is configured in the same manner as the high-capacity stacker 346, and mechanisms of elements of the high-capacity stacker 347 indicated by reference numerals 356 to 363 are the same as mechanisms of elements of the high-capacity stacker 346 indicated by reference numerals 348 to 355, respectively; therefore, a description thereof will be omitted.

The finisher 334 will now be described. The finisher 334 applies post-processes to printed sheets in accordance with functions designated by a user. Specifically, it has functions such as stapling (binding at one or two positions), punching (two or three holes), and saddle-stitch bookbinding. The finisher 334 includes two discharge trays 335, 336, and sheets are output to the discharge tray 335 via a sheet conveyance path 341. Processes of stapling and the like cannot be executed via the sheet conveyance path 341. In order to execute processes of stapling and the like, a process unit 343 performs finishing in accordance with functions designated by the user via a sheet conveyance path 342, and resultant sheets are output to the discharge tray 336. The discharge trays 335, 336 can be raised and lowered, and it is possible to perform an operation of lowering the discharge tray 335 and loading sheets to which the process unit 343 has applied a finishing process through a lower discharge outlet. If an insertion sheet has been designated by the user, an insertion sheet that is set on an inserter 338 can be inserted at a predetermined page via a sheet conveyance path 340. If saddle-stitch bookbinding is designated, a saddle-stitch process unit 344 staples sheets at the center, folds the stapled sheets in half, and then discharges the sheets to a saddle-stitch bookbinding tray 337 via a sheet conveyance path 345. The saddle-stitch bookbinding tray 337 has a belt conveyer structure that conveys a saddle-stitched book loaded on the saddle-stitch bookbinding tray 337 toward the left.

The scanner unit 202 and a document feeder will now be described.

These are used mainly for a copy function, and in order to read a document set on a platen, the user sets the document on the platen and closes the document feeder. Consequently, an open/close sensor detects closure of the platen, and a reflective document size detection sensor disposed in a housing of the scanner unit 202 detects the size of the set document. When the user has pressed a start button of an operation unit, the document is irradiated by a light source based on this size detection, a CCD detects light that has been reflected therefrom and converts the light into a digital image signal, and the digital image signal is converted into a laser printing signal through desired image processing applied thereto. The printing signal converted this way is stored into a memory of the main controller 201, which will be described later with reference to FIG. 4.

On the other hand, in order to read a document set on the document feeder, the user places the document on a document setting unit of the document feeder in such a manner that the document faces up. Consequently, a document presence sensor detects the set document. When the user has pressed the start button of the operation unit, driving of a document feeding roller and a conveyance belt is started, and the document is conveyed and moved to a predetermined position on the platen. Thereafter, an image of the document is read in a manner similar to the case in which the document set on the platen is read, and the read image is stored into the memory of the main controller 201.

The cutting apparatus 366 will now be described.

The cutting apparatus 366 is arranged between the high-capacity stacker 346 and the fixing apparatus 302. Therefore, after the cutting process, it is possible to switch between the high-capacity stacker 346 and the high-capacity stacker 347 as a discharge destination, and to apply additional post-processes in the finisher 334. In a case where the cutting process is not to be executed, sheets conveyed from the fixing apparatus 302 are conveyed to the subsequent high-capacity stacker 346 via a sheet conveyance path 367 without going through any process. On the other hand, in a case where the cutting process is to be executed, sheets are conveyed via a sheet conveyance path 368, stopped in a horizontal portion of the sheet conveyance path below a cutting unit 369, and cut by the cutting unit 369. The cutting unit 369 is attachable/detachable, and can be interchanged with a punch unit. A punch scrap box 370 is provided as it is necessary to store punch scraps resulting from the execution of punching in a case where the punch unit is installed. Cut sheets are conveyed to the subsequent high-capacity stacker 346 via the conveyance paths.

Figure 4:
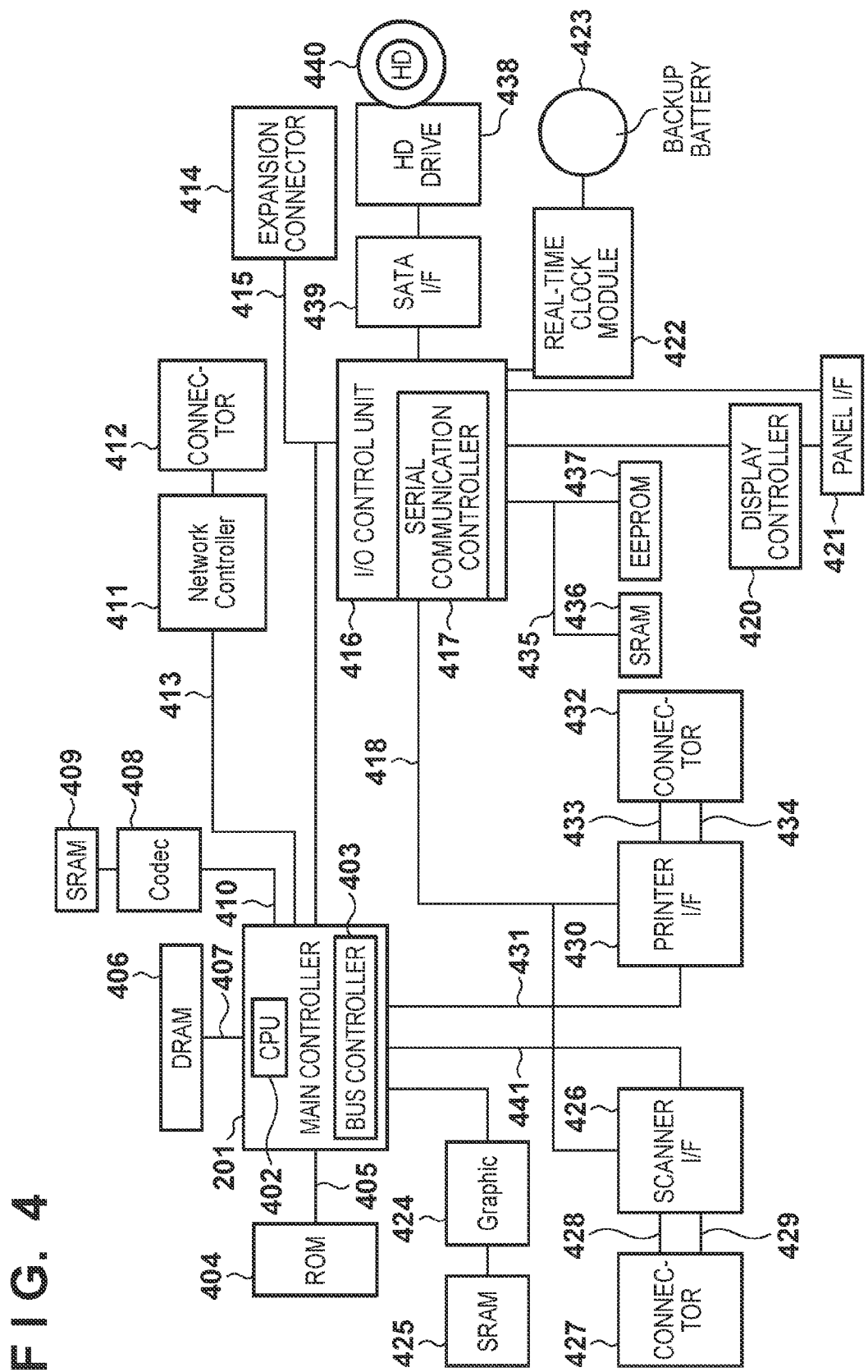
FIG. 4 is a block diagram for describing a hardware configuration of the main controller.

FIG. 4 is a block diagram for describing a hardware configuration of the main controller 201 according to the embodiments. In the present embodiments, the main controller 201 is described as being provided in a main body of the printing apparatus 301 of FIG. 3; however, it may be provided in another apparatus. This main controller 201 mainly includes a CPU 402, a bus controller 403, and various types of I/F controller circuits.

The CPU 402 and the bus controller 403 control the operations of the entire printing system, and the CPU 402 operates based on a program read from a ROM 404 via a ROM I/F 405. An operation of interpreting PDL (page description language) code data received from the PC 205 and deploying the PDL code data into raster image data is also described in this program. The bus controller 403 controls data transfer that is input/output from the I/Fs, and controls bus arbitration and DMA data transfer. A DRAM 406 is connected to the main controller 201 via a DRAM I/F 407, and provides a working area for the operations of the CPU 402 and an area for accumulating image data.

A codec 408 compresses raster image data accumulated in the DRAM 406 using a method such as MH, MR, MMR, JBIG, and JPEG, and conversely decompresses the compressed code data into raster image data. An SRAM 409 is used as a temporary working area for the codec 408. The codec 408 is connected to the main controller 201 via an I/F 410, and data transfer to/from the DRAM 406 is controlled by the bus controller 403 and performed by way of DMA. A graphic processor 424 applies processing such as rotation, scaling, color space conversion, and binarization to raster image data accumulated in the DRAM 406. An SRAM 425 is used as a temporary working area for the graphic processor 424. The graphic processor 424 is connected to the main controller 201 via an I/F, and data transfer to/from the DRAM 406 is controlled by the bus controller 403 and performed by way of DMA. A network controller 411 is connected to the main controller 201 via an I/F 413, and is connected to an external network via a connector 412. A common example of this external network is the Ethernet (registered trademark).

An expansion connector 414 for connection of an expansion board, as well as an I/O control unit 416, is connected to a general-purpose high-speed bus 415. A common example of the general-purpose high-speed bus 415 is a PCI bus. The I/O control unit 416 is equipped with a two-channel asynchronous serial communication controller 417 for transmitting and receiving control commands to and from CPUs of the scanner unit 202 and the printer unit 203. It is also connected to a scanner I/F circuit 426 and a printer I/F circuit 430 via an I/O bus 418.

A panel I/F 421 is connected to a display controller 420, and includes an I/F for performing display on a display unit 505 (FIG. 5) of an operation unit 501 (FIG. 5), and a key input I/F for performing input through hardware keys and touchscreen keys. The operation unit includes the display unit, a touchscreen attached to a screen of the display unit, and a plurality of hardware keys. A signal input through the touchscreen or the hardware keys is carried to the CPU 402 via the panel I/F 421. The display unit displays image data sent from the panel I/F 421. This display unit displays functions, image data, and the like.

A real-time clock module 422 updates/saves the date and time managed in the apparatus, and is backed up by a backup battery 423. An external storage apparatus is connected to a SATA interface 439; in the present embodiments, a hard disk drive 438 is connected via this I/F 439. A hard disk 440 of the hard disk drive 438 is used to store image data and the like. A connector 427 is connected to the scanner unit 202, an asynchronous serial I/F 428, and a video I/F 429, and a connector 432 is connected to the printer unit 203, an asynchronous serial I/F 433, and a video I/F 434. The scanner I/F 426 is connected to the scanner unit 202 and the main controller 201 via the connector 427 and a scanner bus 441, respectively, and has a function of applying predetermined processing to image data received from the scanner unit 202. It also has a function of outputting, to the scanner bus 429, a control signal generated based on a video control signal sent from the scanner unit 202. Data transfer from the scanner bus 429 to the DRAM 406 is controlled by the bus controller 403. The printer I/F 430 is connected to the printer unit 203 and the main controller 201 via the connector 432 and a printer bus 431, respectively, and outputs, to the printer unit 203, image data output from the main controller 201 after applying predetermined processing thereto. It also has a function of outputting, to the printer bus 431, a control signal generated based on a video control signal sent from the printer unit 203. Data transfer of raster image data deployed into the DRAM 406 to the printer unit 203 is controlled by the bus controller 403, and this data transfer to the printer unit 203 is performed via the printer bus 431 and the video I/F 434 by way of DMA. An SRAM 436 is connected to the I/O control unit 416 via a bus 435, and even if the power is shut down, it can retain the contents stored therein due to the power supplied from the backup battery. An EEPROM 437 is similarly connected to the I/O control unit 416 via a bus 435.

A description is now given of the operation unit 501 that performs various types of settings.

Figure 5A:
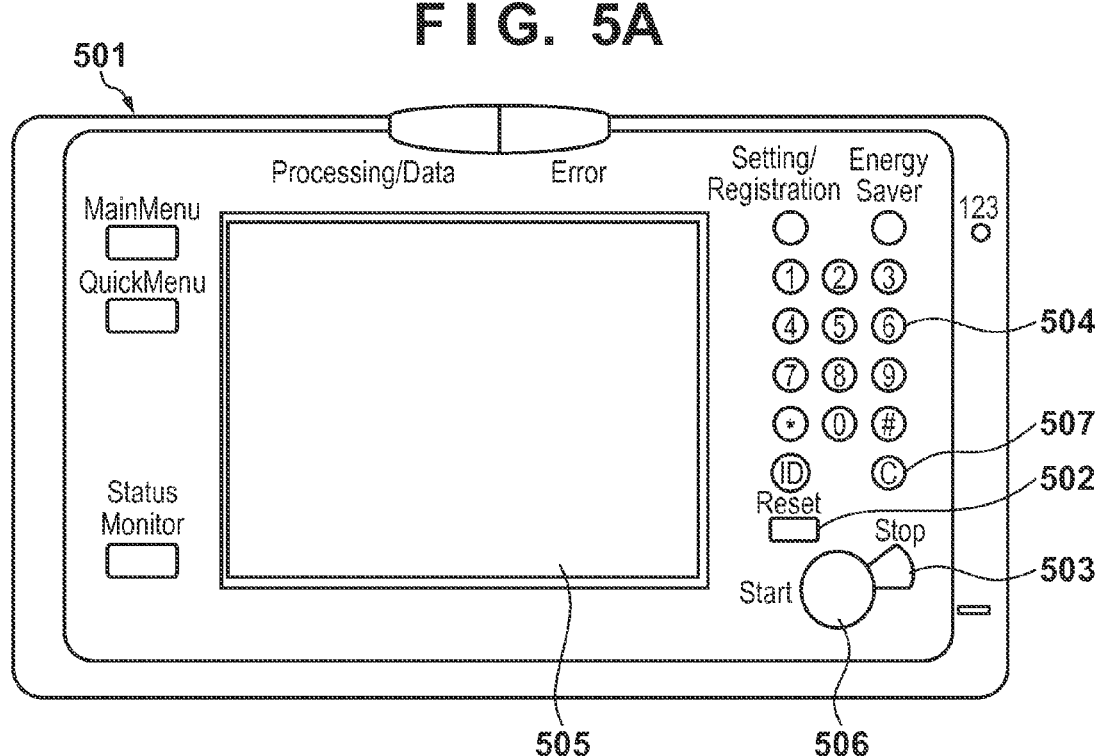
FIG. 5A is a top view showing a configuration of an operation unit.

FIG. 5A is a top view showing a configuration of the operation unit 501 according to the embodiments. This operation unit 501 is connected to the panel I/F 421 of FIG. 4.

A reset key 502 is a key for cancelling, for example, a setting value set by the user. A stop key 503 is a key for stopping the execution of a job in operation. Numeric keys 504 are used to input numeric values such as the number of copies. The display unit 505 is a touch-sensitive operation screen and displays, for example, a main menu screen shown in FIG. 5B. A start key 506 is a key for starting jobs such as reading of a document. A clear key 507 is a key for clearing various types of values set on this screen. Other hardware keys are also provided, including a default setting/registration button, an energy saving instruction button, a button for displaying the main menu, a quick menu button for constructing a customized screen on a user-by-user basis, and a status monitoring button for displaying an apparatus status.

Figure 5B:
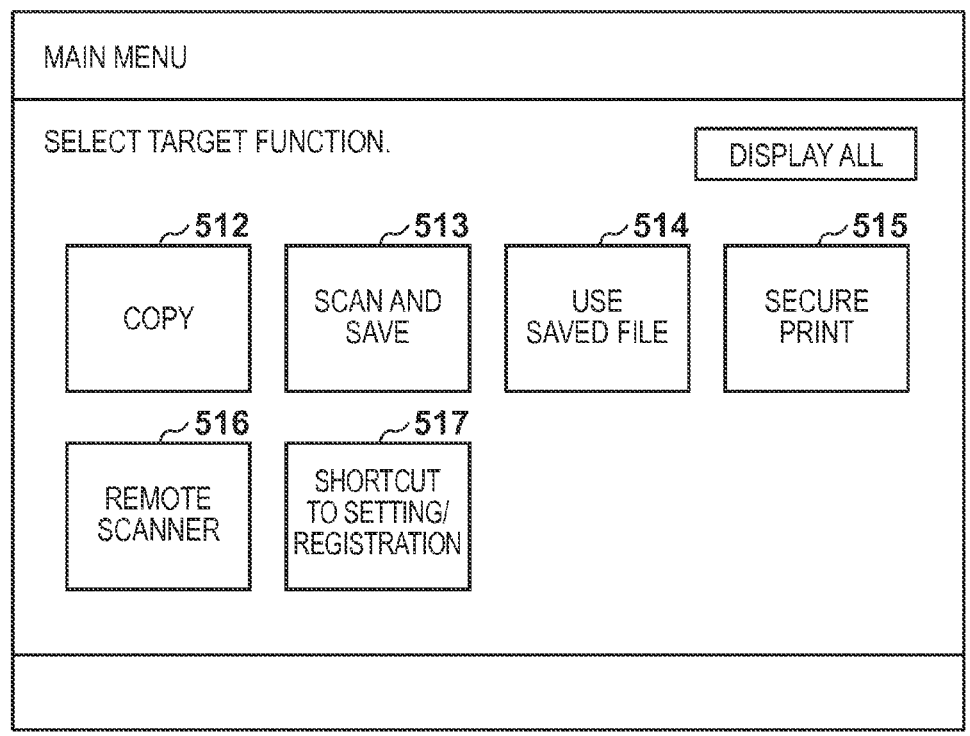
FIG. 5B shows a main menu screen displayed on a display unit of the operation unit.

FIG. 5B shows an example of a main menu screen displayed on the display unit 505 of the operation unit 501.

In this example, the following buttons are displayed: a copy button 512, a scan and save button 513, a use saved file button 514, a secure print button 515, a remote scanner button 516, and a shortcut to setting/registration button 517. The scan and save button 513 issues an instruction about a function of scanning a document with the scanner unit 202 and storing image data thereof into the hard disk (HDD) 440. The use saved file button 514 issues an instruction about a function of printing and transmitting image data saved in the HDD 440. The secure print button 515 issues an instruction about a function in which the user operates a secure print job that is assigned a password. The remote scanner button 516 issues an instruction about a remote scanner function of reading a document with the scanner unit 202 by operating this printing apparatus 301 from the PC 205 and transmitting image data thereof to the PC 205. When the user has pressed any of these buttons 512 to 517, a setting screen corresponding to the function of the pressed button is displayed.

Figure 6A:
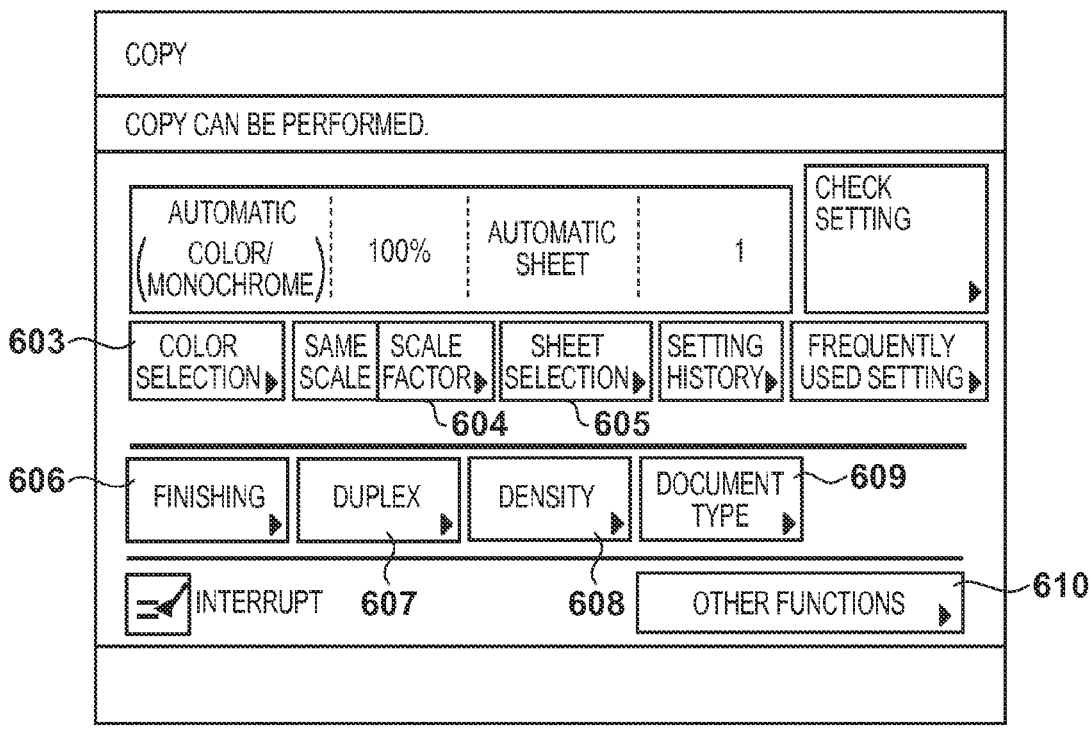
FIG. 6A shows a copy screen displayed when a user has pressed a copy button on the main menu screen.

FIG. 6A shows an example of a copy screen that is displayed when the user has pressed the copy button 512 on the main menu screen of FIG. 5B.

When a color selection button 603 has been pressed on this copy screen, a pull-down menu is displayed that enables selection of one of the following color modes: color, monochrome, and automatic. The figure depicts a state in which "automatic" has been selected as a color mode. The following buttons are included: a scale factor designation button 604, a sheet selection button 605, a finishing button 606 for issuing an instruction about post-processes such as shift-sort and staple-sort, and a duplex button 607 for designating duplex printing. The following buttons are also provided: a density button 608 for designating density, a document type button 609 for selecting a document type, an other functions button 610 for setting other types of application modes, and the like. As these buttons are widely known, a detailed description thereof will be omitted.

Figure 6B:
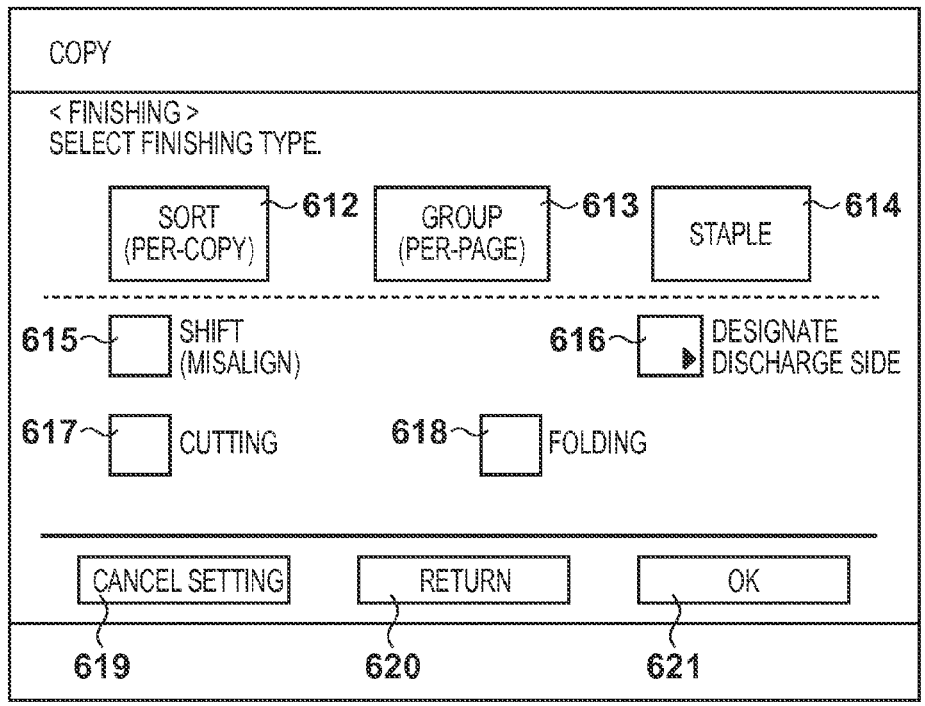
FIG. 6B shows a screen for a case in which a finishing button has been pressed.

FIG. 6B shows an example of a screen for a case in which the finishing button 606 has been pressed in FIG. 6A.

On this screen, finishing types are selected. As the overall setting for finishing, one of sort (per-copy) 612, group (per-page) 613, and staple 614 can be selected. As the more detailed setting, whether or not to load sheets such that their positions are misaligned on a per-copy basis can be selected using a shift button 615. Whether to discharge sheets such that sides of printed images face up or face down is selected using discharge side designation 616. Selection of a cutting button 617 makes the transition to a screen of FIG. 7. The details will be described later. A folding button 618 is used to select a folding type such as two-fold, three-fold, four-fold, and Z-fold. A cancel setting button 619 is used to cancel various types of settings made on this screen. A return button 620 issues an instruction for returning to a top screen of the copy function. An OK button 621 is used to decide on the overall setting for finishing.

Figure 7:
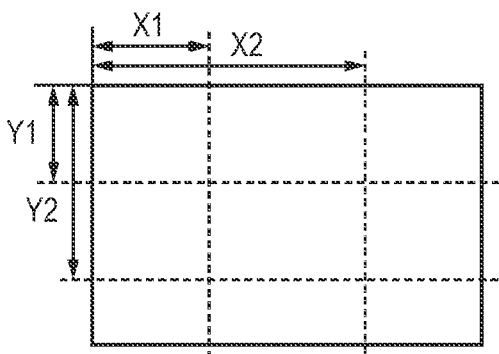
FIG. 7 shows a cut setting screen.

FIG. 7 shows an example of a cut setting screen according to the embodiments. This screen is used to designate positions at which sheets are cut. In this example, guidance is displayed for allowing the user to set positions at which sheets are cut in X (horizontal) and Y (vertical) directions on the basis of the top of the sheets; in order to cut the sheets in the X direction, a length is input to an input field 702. In order to cut the sheets twice in the X direction, a length is input also to an input field 703. In order to cut the sheets in the Y direction, a length is input to an input field 704. In order to cut the sheets twice in the Y direction, a length is input also to an input field 705. This cut setting screen is merely illustrative, and it is permissible to configure, for example, a setting screen that allows a standard size to be cut in half and therefore does not require input of a numeric value of a length. A cancel button 706 is a button for cancelling settings on this screen. An OK button 707 is a button for deciding on settings on this screen. If appropriate numeric values are input to all of the input fields 702 to 705, one sheet will be divided into six sheets.

Figure 8A:
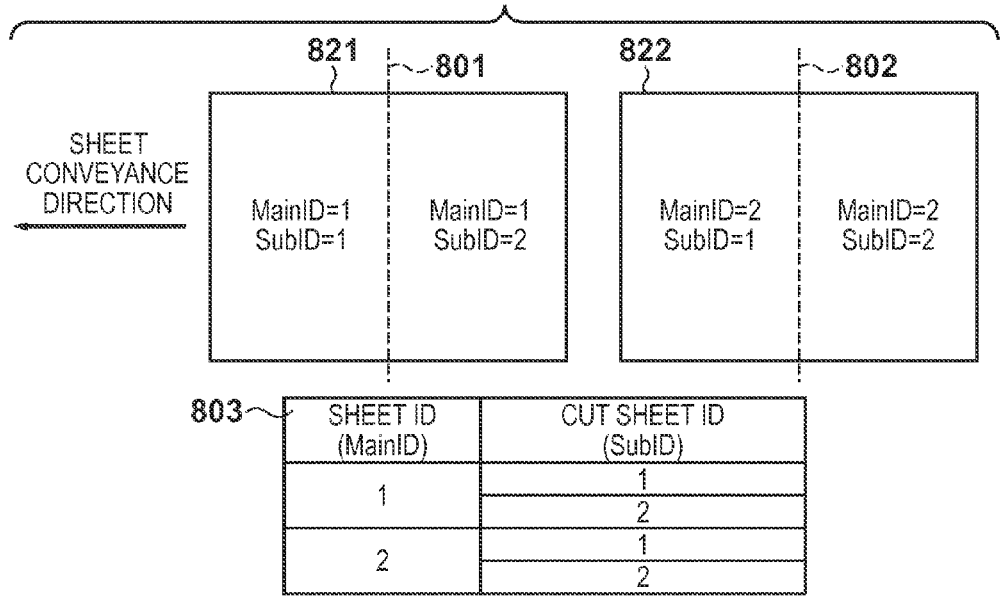
FIGS. 8A and 8B are diagrams for describing control of a cutting management unit of the main controller.
Figure 8B:
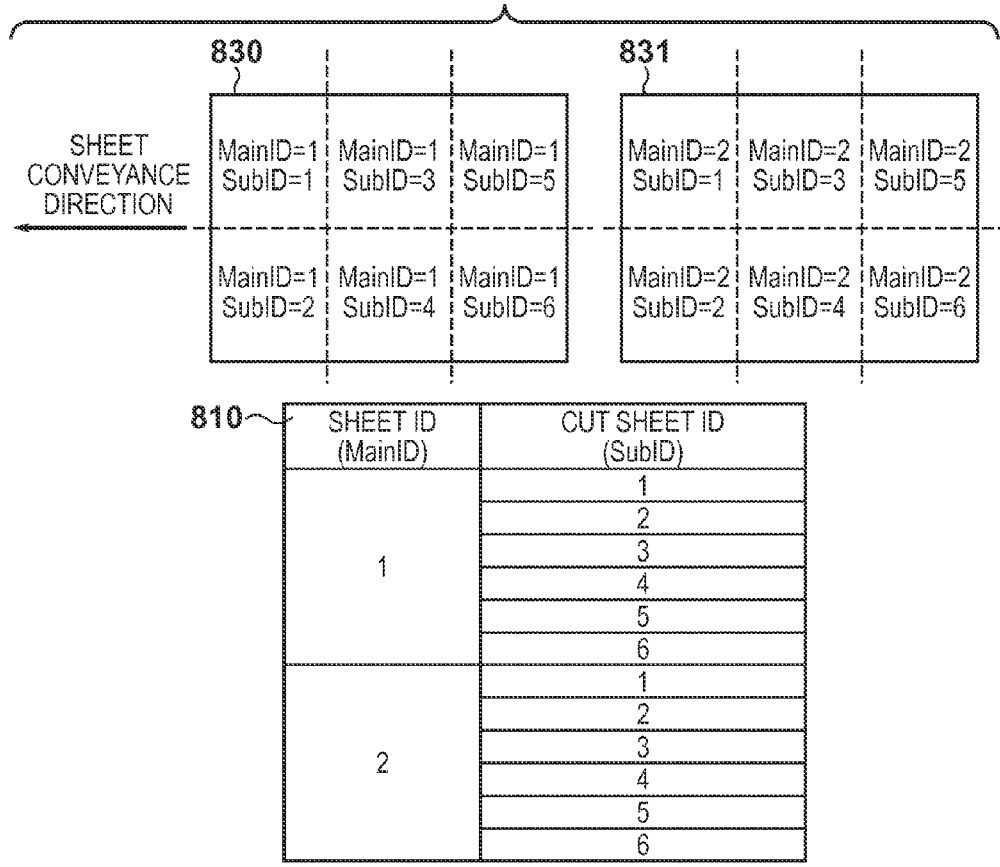

FIGS. 8A and 8B are diagrams for describing control of the cutting management unit 214 of the main controller 201 according to the embodiments.

FIG. 8A depicts a case in which sheets are cut only once in the X direction so as to divide the sheets in half.

A sheet ID management table 803 pertains to a case in which sheets are cut only once in the X direction so as to divide the sheets in half. In this case, there are two sheets prior to the cutting, and among these, the first sheet 821 is cut at a position 801, and the second sheet 822 is cut at a position 802. MainIDs and SubIDs, which are respectively IDs of uncut sheets and IDs of cut sheets, are managed as sheet IDs. A MainID of the first sheet 821 is "1", and a MainID of the second sheet 822 is "2".

If a jam occurs before the sheets are cut, the sheets can be managed using MainIDs only. On the other hand, if a jam occurs during conveyance of the sheets after the sheets have been cut, SubIDs are referred to so as to determine whether all or a part of sheets with SubIDs associated with the same MainID is jammed. For example, assume a case in which the same image is printed on an A3-size sheet in 2-in-1, the printed sheet is cut in half, and two A4-size sheets on which the same image has been printed are obtained. In this case, if both of the two A4-size sheets are jammed, it is sufficient to re-print an original A3-size sheet and cut it in half again. On the other hand, if one of the two A4-size sheets is jammed, later-described processing is executed to avoid image redundancy on the A4-size sheets.

FIG. 8B depicts a case in which sheets are cut twice in the X direction and once in the Y direction, that is to say, one sheet is cut into six sheets.

A sheet ID management table 810 pertains to a case in which one sheet is cut twice in the X direction and once in the Y direction so as to divide it into six sheets. In this case, a MainID of the first sheet 830 is "1", a MainID of the second sheet 831 is "2", and SubIDs of cut sheets include "1" to "6".

It should be noted that processing executed in the case where one sheet is divided into six sheets is basically the same as processing executed in the aforementioned case where one sheet is divided into two sheets. It is assumed that the cut sheets are conveyed to a subsequent apparatus in order of their SubIDs.

Figure 9:
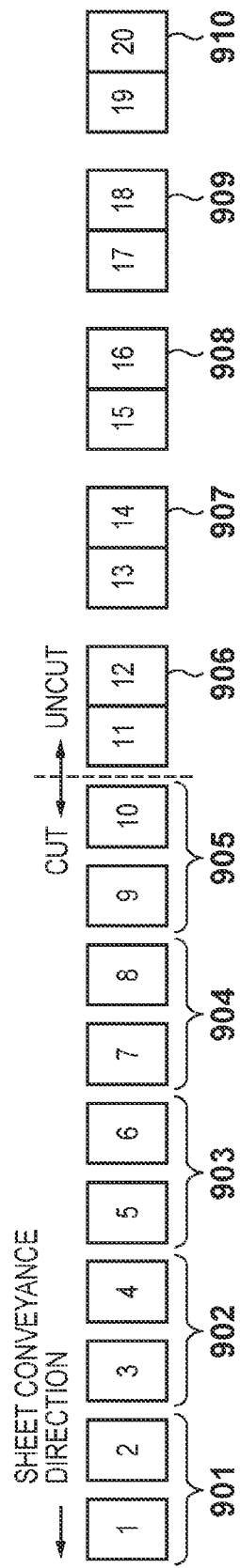
FIG. 9 is a diagram for describing conveyance of sheets in a case where a printing apparatus prints two same images on each one of A3-size sheets in 2-in-1, and a cutting apparatus cuts each one of these sheets to A4 size by bisecting it in an X direction.

FIG. 9 is a diagram for describing conveyance of sheets in a case where the printing apparatus 301 prints two same images on each one of A3-size sheets in 2-in-1, and the cutting apparatus 366 cuts each one of these sheets to A4 size by bisecting it in the X direction.

Here, images 1 to 20 are printed on A3-size sheets 901 to 910 with a 2-in-1 layout. To explain with combined reference to the cross-sectional diagram of FIG. 3, A4-size sheets on which the images 1 and 2 have been printed are either being conveyed in the finisher 334, or have already been discharged to a discharge tray of the finisher 334. A4-size sheets on which the images 3 to 5 have been printed are being conveyed in the high-capacity stacker 347. A4-size sheets on which the images 6 to 8 have been printed are being conveyed in the high-capacity stacker 346. Sheets on which the images 9 and 10 have been printed have just been cut by the cutting apparatus 366 and are being conveyed in the cutting apparatus 366.

Reference numerals 906 to 910 denote uncut A3-size sheets. The sheet 906 is being conveyed in the cutting apparatus 366 and is just about to get cut, and the sheets 907 and 908 have already been printed by the printing apparatus 301 and are being conveyed in the fixing apparatus 302. The sheets 909 and 910 have not been printed yet and are being conveyed in either the printing apparatus 301 or the high-capacity feeding deck 320.

FIGS. 10A and 10B are diagrams for describing examples of recovery from a jam.

FIG. 10A shows an example in which sheets that precede an uncut sheet 1010 are being conveyed after getting bisected, and subsequent sheets 1012 to 1014 are jammed. This case represents jamming of uncut sheets. Therefore, recovery from this jam can be achieved by re-printing the sheets 1012 to 1014 and cutting them with the cutting apparatus 366 at the time of jam recovery, even without information of MainIDs and SubIDs controlled by the cutting management unit 214.

FIG. 10B shows an example in which a jam has occurred involving a cut sheet on which the image 7 has been printed through uncut A3-size sheets 1023 to 1027. In this case, a sheet of the image 8, which was printed on the same sheet 1021 as the image 7 prior to the cutting, is jammed simultaneously. That is to say, in an attempt to perform recovery from the jam based only on information prior to the cutting, it is sufficient to start a process of recovery from the jam by causing the printing apparatus 301 to perform the printing again, starting from the A3-size sheet 1021 of the images 7 and 8. Therefore, in the case of FIG. 10B, the printing apparatus 301 re-prints the A3-size sheet 1021 of the images 7 and 8 through the sheet 1027, and the re-printed sheets are conveyed to and cut by the cutting apparatus 366; in this way, recovery from the jam can be achieved without printing sheets of the same image in a redundant manner.

FIG. 12 is a diagram for describing processing according to the present embodiments. A jam occurrence pattern shown therein is the same as the pattern shown in FIG. 11.

The images 7 and 8 were printed on the same sheet 1101 prior to the cutting; according to the sheet ID management table 803 of FIG. 8A, the sheet 1101 is the fourth uncut sheet. Therefore, information of an A4-size sheet 1201 on which the image 7 has been printed is as follows: MainID=4, SubID=1, discharge notification=normal. On the other hand, information of an A4-size sheet 1202 on which the image 8 has been printed is as follows: MainID=4, SubID=2, discharge notification=jam.

The recovery control unit 211 can determine that, among sheets obtained by cutting one sheet, one has been discharged normally and the other is jammed by checking the statuses of all SubIDs associated with a MainID of the A4-size sheet 1202 when the jam is eliminated. In this case, the feed instruction unit 212 sets the feed instruction 105 (FIG. 1B) following the jam recovery so as to process the sheet 1201 with a SubID of "1", which has already been discharged normally, to be discharged to an escape tray, and notifies the printer unit 203 of the same. As a result, in a printing process following the jam recovery, after the images 7 and 8 are printed together on the A3-size sheet 1101 and a cutting process is applied to the sheet 1101, only an A4-size sheet on which the image 7 has been printed is discharged to the discharge tray 350. On the other hand, an A4-size sheet on which the image 8 has been printed is discharged to a designated discharge destination, similarly to other preceding sheets. Also, images 9, 10, images 11, 12, images 13, 14, images 15, 16, images 17, 18, and images 19, 20 are printed on subsequent A3-size sheets. When the image 20 printed on a sheet 1203 is finally discharged on a cut A4-size sheet, the processes are completed. At this point, the display unit 505 of the operation panel 501 may display the completion of the job, together with a notification to the user indicating that a sheet was printed in a redundant manner at the time of jam recovery and that sheet was discharged to the discharge tray 350.

FIG. 13 is a diagram for describing jam recovery control according to another embodiment. In the following description, it will be assumed that a jam occurrence pattern is the same as the pattern shown in FIGS. 11 and 12.

Information of a sheet on which the image 7 has been printed is as follows: MainID=4, SubID=1, discharge notification=normal. On the other hand, information of a sheet on which the image 8 has been printed is as follows: MainID=4, SubID=2, discharge notification=jam. Here, by checking the statuses of all SubIDs associated with the MainID of the sheet on which the image 8 has been printed when the jam is eliminated, it is found that, among two cut sheets including images that were printed on an A3-size sheet, one has been discharged normally and the other is jammed. Next, a sheet size of the SubID associated with discharge notification=jam is calculated. In the present example, as the uncut sheet size is A3 and the number of times sheets are cut is one, it can be determined that the cut sheet size is half thereof, that is to say, A4. In the present example, only one sheet including the image 8 shows discharge notification=jam; however, if the number of times sheets are cut is plural, or if positions at which sheets are cut do not yield equally-divided sheets, the cut sheet size can be obtained based on information of the number of times sheets are cut and positions at which sheets are cut, which are set on the screen of FIG. 7.

Next, whether or not the calculated sheet size matches any of sheet sizes set for the feeding decks 305, 306 of the printing apparatus 301 and the feeding decks 322 to 324, 329 to 331 of the high-capacity feeding decks 320, 321 is determined. If there is a feeding unit with a matching sheet size, the recovery control unit 211 decides to feed a sheet on which the image 8 is to be printed from the feeding unit with the matching sheet size, instead of a feeding unit designated by a feeder designation set by the feed instruction unit 212. Then, a notification indicating that the sheet should be fed from the feeding unit with the matching sheet size is sent to the printer unit 203. In this way, the image 8 is controlled to be printed on an A4-size sheet fed from another feeding unit. That is to say, although the images 7 and 8 were printed on an A3-size sheet with a 2-in-1 layout and this A3-size sheet was cut by the cutting apparatus 366 prior to the occurrence of the jam, the image 8 is printed on an A4-size sheet after the jam recovery. With regard to information of cut A4-size sheets including the images 9 and 10, their SubIDs are both associated with discharge notification=jam. Therefore, at the time of jam recovery, control is performed such that the images 9 and 10 are printed on an A3-size sheet 1301 in 2-in-1 and a cutting process is applied to the printed A3-size sheet. In a similar manner, corresponding images are printed on subsequent A3-size sheets and a cutting process is applied thereto; consequently, recovery from the jam can be achieved, and a plurality of copies of sheets on which desired images have been printed can be obtained.

Figure 14:
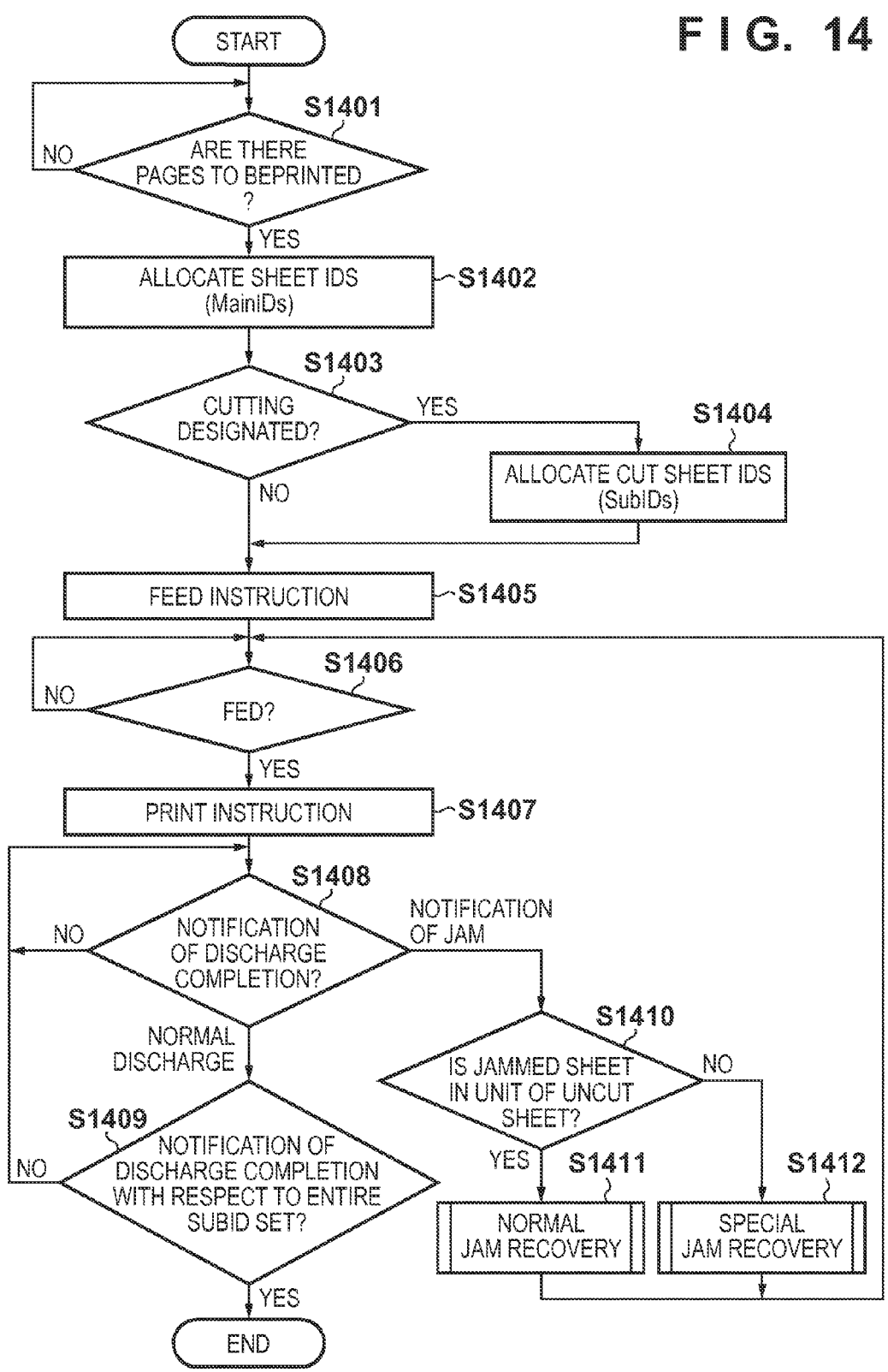
FIG. 14 is a flowchart for describing processing of the main controller.
Figure 16:
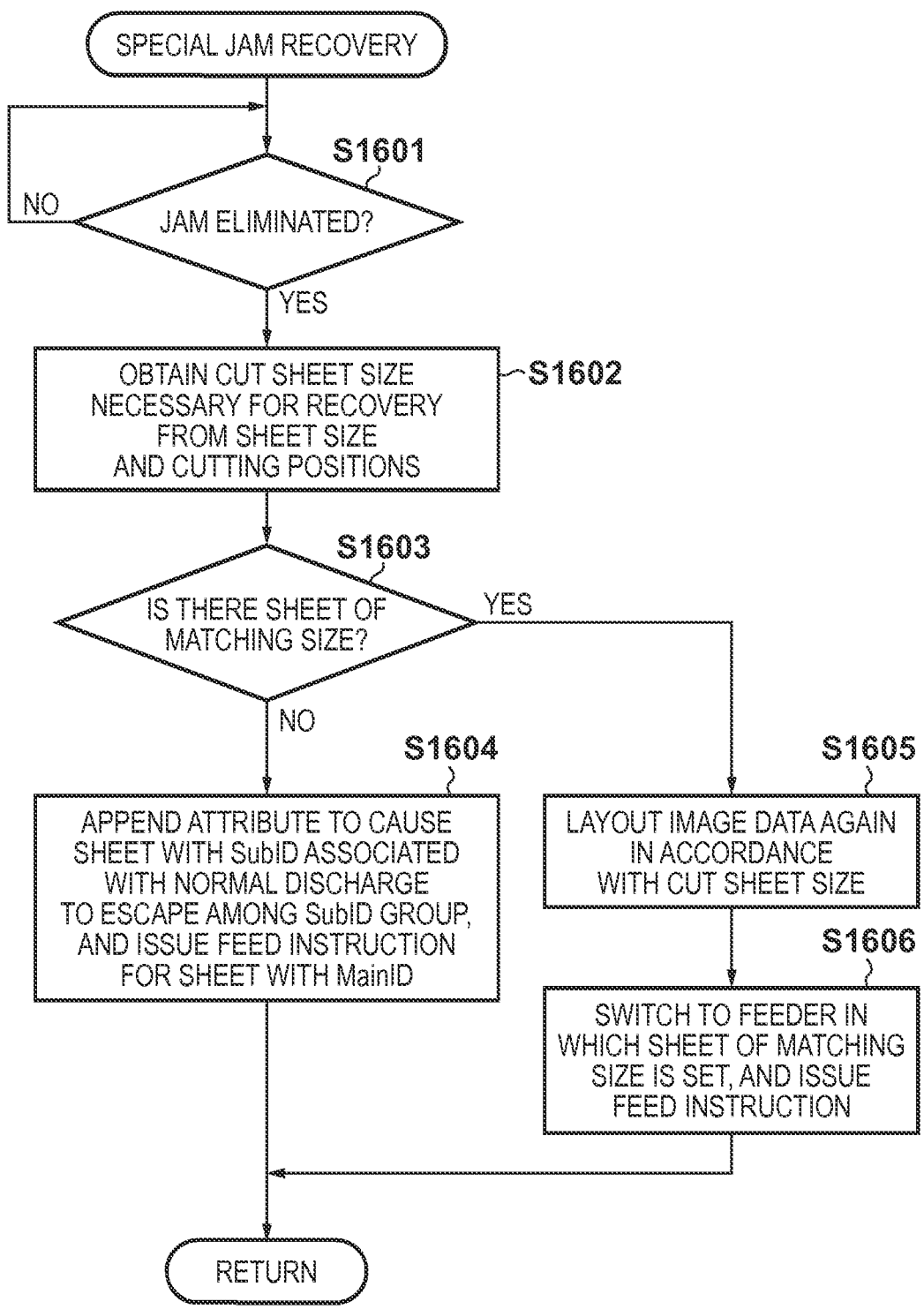
FIG. 16 is another flowchart for describing the special jam recovery process of step S1412.

Finally, a description is given of the flow of control processing according to the present embodiments with reference to flowcharts of FIGS. 14 to 16.

FIG. 14 is a flowchart for describing processing of the main controller 201 according to the embodiments. It should be noted that a program that executes this processing is deployed from the HDD 440 into the DRAM 406 at the time of execution, and is executed under control of the CPU 402.

First, in step S1401, the CPU 402 determines whether or not there are pages to be printed. If there is no page to be printed, preparation of pages to be printed is waited for in step S1401. If there are pages to be printed, processing proceeds to step S1402, and the CPU 402 allocates sheet IDs to the sheets to be printed. Here, among the information of the sheet ID management tables shown in FIGS. 8A and 8B, MainIDs that identify uncut sheets are allocated. Next, processing proceeds to step S1403, and the CPU 402 determines whether or not the cutting has been designated. If the cutting has not been designated, processing proceeds to step S1405, and a feed instruction is issued. On the other hand, if the cutting has been designated in step S1403, processing proceeds to step S1404, and the CPU 402 allocates corresponding sheet IDs to cut sheets and proceeds to step S1405 to issue the feed instruction. After the feed instruction has been issued in step S1405, processing proceeds to step S1406, and the CPU 402 waits for the arrival of a response indicating that the printer unit 203 has accepted the feed instruction. Upon arrival of the response indicating the acceptance of the feed instruction, processing proceeds to step S1407, and the CPU 402 transmits a print instruction to the printer unit 203.

Next, processing proceeds to step S1408, and the CPU 402 determines whether it has been notified of discharge completion or a jam by the printer unit 203. It is assumed here that a stack unit of the high-capacity stacker 346 has been designated as a discharge destination for a job. In a case where the stack unit has been designated as the discharge destination, sheets on which images have been printed through the execution of the job are discharged to the lift table 348 of the high-capacity stacker 346 if they have been conveyed normally without getting jammed. Upon detection of the completion of discharge of the sheets by a discharge detection sensor that detects discharge of the sheets, the printer unit 203 sends a discharge completion notification to the CPU 402. On the other hand, upon receiving signals from a plurality of sheet detection sensors along a sheet conveyance path, the printer unit 203 determines that a sheet is jammed along the conveyance path. Specifically, after a certain sheet detection sensor has detected a passing sheet, if a sheet detection sensor that is supposed to detect the sheet next has not detected the sheet for a predetermined time period, the printer unit 203 determines that the sheet is jammed. Upon notification of normal discharge in step S1408, processing proceeds to step S1409, and the CPU 402 determines whether or not it has been notified of discharge completion with respect to all sheets to which SubIDs have been allocated. At this time, if the cutting has not been designated, SubIDs have not been allocated to the sheets, and therefore processing is ended directly. On the other hand, if the cutting has been designated, there are a plurality of cut sheets with SubIDs, and therefore steps S1408 and S1409 are executed until the arrival of notifications of discharge completion corresponding to these sheets. When discharge of all sheets to which SubIDs have been allocated is completed normally, the present processing is ended.

On the other hand, upon notification of a jam in step S1408, processing proceeds to step S1410, and whether or not a jammed sheet corresponding to the notification of the jam is in a unit of an uncut sheet is determined based on a MainID and a SubID of the jammed sheet. If the jammed sheet is in a unit of an uncut sheet, the jammed sheet corresponds to the uncut sheets 1021 to 1027, in which case the recovery can be achieved by re-printing the sheets 1021 to 1027 and cutting them with the cutting apparatus 366 as exemplarily described with reference to FIG. 10B. Therefore, in this case, processing proceeds to step S1411, and a normal jam recovery process is executed. The process of this step S1411 will be described later in detail.

On the other hand, if the jammed sheet is not in a unit of an uncut sheet in step S1410, processing proceeds to step S1412. In this case, as exemplarily described with reference to FIG. 11, the normally discharged sheet on which the image 7 has been printed is one part of the uncut sheet 1101, and the jammed sheet on which the image 8 has been printed is the other part of the sheet 1101. That is to say, a unit of the jammed sheet is different from a unit of the uncut sheet. In this case, processing proceeds to step S1412, and a process of special jam recovery is executed. When processing enters a restartable state after the jam is eliminated through normal jam recovery or special jam recovery, processing returns to step S1406.

FIG. 15A is a flowchart for describing a normal jam recovery process of step S1411.

First, in step S1501, the CPU 402 determines whether or not a jam has been eliminated (waits for the elimination of the jam). If the jam is determined to have been eliminated, processing proceeds to step S1502, and the CPU 402 issues a feed instruction and ends the present processing.

Consequently, processing proceeds to step S1406 of FIG. 14, and a response to the feed instruction is waited for. Upon arrival of the response, processing proceeds to step S1407, and an uncut sheet corresponding to the jam is printed and cut; in this way, recovery from the jam can be achieved without image redundancy as exemplarily shown in FIG. 10B.

FIG. 15B is a flowchart for describing a special jam recovery process of step S1412.

In step S1510, the CPU 402 waits for the elimination of the jam. Upon elimination of the jam, processing proceeds to step S1511, and the CPU 402 sets an attribute so as to cause a sheet with a SubID associated with normal discharge to escape among SubIDs associated with a MainID of cut sheets. Then, a feed instruction is issued with respect to a sheet with the MainID, and processing is ended. To explain with reference to FIG. 11, as the first jammed sheet of the image 8 has a MainID of 4 and a SubID of 2, an attribute is set so as to discard a sheet with a MainID of 4 and a SubID of 1 associated with normal discharge. Then, a feed instruction is issued with respect to the sheet 1101 with a MainID of 4. With respect to sheets following the sheet 1101, a feed instruction is issued in a manner similar to a previous feed instruction, and the sheets are printed by the printing apparatus 301 and cut by the cutting apparatus 366.

In this way, only the sheet of the image 7, which was printed and cut after the occurrence of the jam, is discharged to the discharge tray 350, and other sheets are sent to a post-process apparatus following a sheet that precedes the occurrence of the jam (in the example of FIG. 11, the sheet of the image 6). That is to say, in order to discard the sheet of the image 7, the sheet of the image 7 is discharged to a discharge destination that is different from a discharge destination of a sheet that was fed prior to the sheet of the image 7. In this way, recovery from the jam can be achieved without redundantly generating a sheet of an image that was not jammed. It should be noted that the method using different discharge destinations may be replaced with a method of discharging a redundant sheet such that it is misaligned with respect to a sheet discharged prior thereto, as long as the user can distinguish the redundant sheet.

FIG. 16 is a flowchart for describing the special jam recovery process of step S1412 according to another embodiment. Here, upon recovery from the jam, an image that was rendered defective due to the jam is printed on a sheet that has the same size as cut sheets, instead of printing the image on a sheet that has the same size as uncut sheets and cutting the printed sheet again. In this way, after the occurrence of the jam, redundant generation of a sheet that includes the same image as a sheet that was already generated prior to the occurrence of the jam is prevented.

First, in step S1601, the CPU 402 waits for the elimination of the jam. If the jam is determined to have been eliminated in step S1601, processing proceeds to step S1602, and the CPU 402 obtains a size of a cut sheet necessary for the recovery from information of a size of fed sheets and positions at which the sheets are cut. Next, processing proceeds to step S1603, and the CPU 402 determines whether or not any of sheet sizes set for feeders of the printer unit 203 matches the size obtained in step S1602. If there is no sheet of the matching size, processing proceeds to step S1604, and the CPU 402 designates escape of a redundant sheet to be discarded and performs printing and cutting for an uncut sheet corresponding to the jammed sheet, similarly to step S1511 of FIG. 15B. The sheet for which escape has been designated is discharged to a discharge destination different from a discharge destination of a sheet that was fed prior to the jammed sheet. It should be noted that the method using different discharge destinations may be replaced with a method of discharging the sheet for which escape has been designated such that it is misaligned with respect to a sheet discharged prior thereto, as long as the user can distinguish the redundant sheet.

On the other hand, if it is determined in step S1603 that the feeders have a sheet of the matching size, processing proceeds to step S1605, and the CPU 402 lays out image data again in accordance with the cut sheet size. Next, processing proceeds to step S1606, and the CPU 402 switches to a feeder in which the sheet of the matching size is set as a sheet feeding source, and issues a feed instruction to the printer unit 203. In this way, for example, in a case where two A4-size sheets are obtained by printing an A3-size sheet and cutting the printed sheet in half, an image that was rendered defective due to a jam is printed directly on an A4-size sheet after the jam is eliminated.

Printing in a unit of an uncut sheet after jam recovery yields the effect of preventing the occurrence of a situation in which the sheet of the image 7 is generated in a redundant manner, as in the case of FIG. 11.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-246674, filed Nov. 28, 2013, which is hereby incorporated by reference herein in its entirety.

What is claimed is:

1. A printing system including a printing apparatus and a cutting apparatus, the cutting apparatus generating a plurality of cut sheets by cutting a single uncut sheet on which a plurality of images have been printed by the printing apparatus, the printing system comprising:
a conveyance unit configured to convey a plurality of cut sheets that have been generated by the cutting apparatus and that each include one of the plurality of images;
a determination unit configured to, in a case where a cut sheet is jammed while being conveyed by the conveyance unit, determine whether or not the jammed cut sheet and a cut sheet preceding the jammed cut sheet have been derived from a same single uncut sheet; and
a control unit configured to
in a case where the determination unit determines that the jammed cut sheet and the cut sheet preceding the jammed cut sheet have not been derived from the same single uncut sheet, perform control such that the printing apparatus re-prints a plurality of images including an image of the jammed cut sheet on another single uncut sheet, the cutting apparatus cuts the re-printed single uncut sheet, and a plurality of cut sheets which are derived from the re-printed single uncut sheet are discharged to a same discharge destination as a discharge destination of the cut sheet preceding the jammed cut sheet, and
in a case where the determination unit determines that the jammed cut sheet and the cut sheet preceding the jammed cut sheet have been derived from the same single uncut sheet, perform control such that the printing apparatus re-prints a plurality of images including an image of the jammed cut sheet on another single uncut sheet, the cutting apparatus cuts the re-printed single uncut sheet, and one of a plurality of cut sheets which is derived from the re-printed single uncut sheet and includes a same image as the cut sheet preceding the jammed cut sheet is discharged to a discharge destination different from a discharge destination cut sheet of the preceding the jammed cut sheet.

2. The printing system according to claim 1, wherein the plurality of images represent the same image, and a plurality of copies of cut sheets on which the image has been printed are generated by the cutting apparatus cutting the single uncut sheet on which the plurality of images have been printed.

3. A printing apparatus that supplies a printed uncut sheet on which a plurality of images have been printed to a cutting apparatus, the printing apparatus comprising:
a control unit configured to perform control such that the cutting apparatus cuts a single uncut sheet in order to generate a plurality of cut sheets, and to cause a conveyance apparatus to convey a plurality of cut sheets that have been generated by the cutting apparatus and that each include one of the plurality of images;
a determination unit configured to, in a case where a cut sheet is jammed while being conveyed by the conveyance apparatus, determine whether or not the jammed cut sheet and a cut sheet preceding the jammed cut sheet have been derived from a same single uncut sheet; and
a control unit configured to
in a case where the determination unit determines that the jammed cut sheet and the cut sheet preceding the jammed cut sheet have not been derived from a same single uncut sheet, perform control such that a plurality of images including an image of the jammed cut sheet are re-printed on another single uncut sheet, the cutting apparatus cuts the re-printed single uncut sheet, and a plurality of cut sheets which are derived from the re-printed single uncut sheet are discharged to a same discharge destination as a discharge destination of the cut sheet preceding the jammed cut sheet, and
in a case where the determination unit determines that the jammed cut sheet and the cut sheet preceding the jammed cut sheet have been derived from the same single uncut sheet, perform control such that a plurality of images including an image of the jammed cut sheet are re-printed on another single uncut sheet, the cutting apparatus cuts the re-printed single uncut sheet, and one of a plurality of cut sheets which is derived from the re-printed single uncut sheet and includes a same image as the cut sheet preceding the jammed cut sheet is discharged to a discharge destination different from a discharge destination of the cut sheet preceding the jammed cut sheet.

4. The printing apparatus according to claim 3, wherein the plurality of images represent the same image, and a plurality of copies of sheets on which the image has been printed are generated by the cutting apparatus cutting the single uncut sheet on which the plurality of images have been printed.

5. A control method of controlling a printing system including a printing apparatus and a cutting apparatus, the cutting apparatus generating a plurality of cut sheets by cutting a single uncut sheet on which a plurality of images have been printed by the printing apparatus, the control method comprising:
a conveyance step of conveying a plurality of cut sheets that have been generated by the cutting apparatus and that each include one of the plurality of images;
a determination step of, in a case where a cut sheet is jammed while being conveyed in the conveyance step, determining whether or not the jammed cut sheet and a cut sheet preceding the jammed cut sheet have been derived from a same single uncut sheet; and
a control step of in a case where the determination step determines that the jammed cut sheet and the cut sheet preceding the jammed cut sheet have not been derived from the same single uncut sheet, performing control such that the printing apparatus re-prints a plurality of images including an image of the jammed cut sheet on another single uncut sheet, the cutting apparatus cuts the re-printed single uncut sheet, and a plurality of cut sheets which are derived from the re-printed single uncut sheet are discharged to a same discharge destination as a discharge destination of the cut sheet preceding the jammed cut sheet, and in a case where the determination step determines that the jammed cut sheet and the cut sheet preceding the jammed cut sheet have been derived from the same single uncut sheet, performing control such that the printing apparatus re-prints a plurality of images including an image of the jammed cut sheet on another single uncut sheet, the cutting apparatus cuts the re-printed single uncut sheet, and one of a plurality of sheets which is derived from the re-printed single uncut sheet and includes a same image as the cut sheet preceding the jammed cut sheet is discharged to a discharge destination different from a discharge destination of the cut sheet preceding the jammed cut sheet.

6. A control method of controlling a printing apparatus that supplies a printed uncut sheet on which a plurality of images have been printed to a cutting apparatus, the control method comprising:

a control step of performing control such that the cutting apparatus cuts a single uncut sheet in order to generate a plurality of cut sheets, and causing a conveyance apparatus to convey a plurality of cut sheets that have been generated by the cutting apparatus and that each include one of the plurality of images;

a determination step of, in a case where a cut sheet is jammed while being conveyed by the conveyance apparatus, determining whether or not the jammed cut sheet and a cut sheet preceding the jammed cut sheet have been derived from a same single uncut sheet; and a control step of in a case where the determination step determines that the jammed cut sheet and the cut sheet preceding the jammed cut sheet have not been derived from the same single uncut sheet, performing control such that a plurality of images including an image of the jammed cut sheet are re-printed on another single uncut sheet, the cutting apparatus cuts the re-printed single uncut sheet, and a plurality of cut sheets which are derived from the re-printed single uncut sheet are discharged to a same discharge destination as a discharge destination of the cut sheet preceding the jammed cut sheet, and in a case where the determination step determines that the jammed cut sheet and the cut sheet preceding the jammed cut sheet have been derived from the same single uncut sheet, performing control such that a plurality of images including an image of the jammed cut sheet are re-printed on another single uncut sheet, the cutting apparatus cuts the re-printed single uncut sheet, and one of a plurality of sheets which is derived from the re-printed single uncut sheet and includes a same image as the cut sheet preceding the jammed cut sheet is discharged to a discharge destination different from a discharge destination of the cut sheet preceding the jammed cut sheet.

7. A non-transitory computer-readable storage medium storing a program that causes computer perform a control method of controlling a printing system including a printing apparatus and a cutting apparatus, the cutting apparatus generating a plurality of cut sheets by cutting a single uncut sheet on which a plurality of images have been printed by the printing apparatus, the control method comprising:

a conveyance step of conveying a plurality of cut sheets that have been generated by the cutting apparatus and that each include one of the plurality of images;

a determination step of, in a case where a cut sheet is jammed while being conveyed in the conveyance step, determining whether or not the jammed cut sheet and a cut sheet preceding the jammed cut sheet have been derived from a same single uncut sheet and a control step of in a case where the determination step determines that the jammed cut sheet and the cut sheet preceding the jammed cut sheet have not been derived from the same single uncut sheet, performing control such that the printing apparatus re-prints a plurality of images including an image of the jammed cut sheet on another single uncut sheet, and the cutting apparatus cuts the re-printed single uncut sheet, and a plurality of cut sheets which are derived from the re-printed single uncut sheet are discharged to a same discharge destination as a discharge destination of the cut sheet preceding the jammed cut sheet, and in a case where the determination step determines that the jammed cut sheet and the cut sheet preceding the jammed cut sheet have been derived from the same single uncut sheet, performing control such that the printing apparatus re-prints a plurality of images including an image of the jammed cut sheet on another single uncut sheet, the cutting apparatus cuts the re-printed single uncut sheet, and one of a plurality of sheets which is derived from the re-printed single uncut sheet and includes a same image as the cut sheet preceding the jammed cut sheet is discharged to a discharge destination different from a discharge destination of the cut sheet preceding the jammed cut sheet.

8. A non-transitory computer-readable storage medium that causes a computer to perform a control method of controlling a printing apparatus that supplies a printed uncut sheet on which a plurality of images have been printed to a cutting apparatus, the control method comprising:

a control step of performing control such that the cutting apparatus cuts a single uncut sheet in order to generate a plurality of cut sheets, and causing a conveyance apparatus to convey a plurality of cut sheets that have been generated by the cutting apparatus and that each include one of the plurality of images;

a determination step of, in a case where a cut sheet is jammed while being conveyed by the conveyance apparatus, determining whether or not the jammed cut sheet and a cut sheet preceding the jammed cut sheet have been derived from a same single uncut sheet and a control step of in a case where the determination step determines that the jammed cut sheet and the cut sheet preceding the jammed cut sheet have not been derived from the same single uncut sheet, performing control such that a plurality of images including an image of the jammed cut sheet are re-printed on another single uncut sheet, the cutting apparatus cuts the re-printed single uncut sheet, and a plurality of cut sheets which are derived from the re-printed single uncut sheet are discharged to a same discharge destination as a discharge destination of the cut sheet preceding the jammed cut sheet, and in a case where the determination step determines that the jammed cut sheet and the cut sheet preceding the jammed cut sheet have been derived from the same single uncut sheet, performing control such that a plurality of images including an image of the jammed cut sheet are re-printed on another single uncut sheet, the cutting apparatus cuts the re-printed single uncut sheet, and one of a plurality of sheets which is derived from the re-printed single uncut sheet and includes a same image as the cut sheet preceding the jammed cut sheet is discharged to a discharge destination different from a discharge destination of the cut sheet preceding the jammed cut sheet.

9. A printing system, comprising:
a print unit configured to print a plurality of images on a single sheet;
a cutting unit configured to cut a single sheet on which a plurality of images have been printed by the print unit, thereby generating a plurality of cut sheet each including one of the plurality of images;
a conveyance unit configured to convey a plurality of cut sheet generated by the cutting unit along a sheet conveyance path;
a first discharge unit configured to discharge a plurality of cut sheet conveyed along the sheet conveyance path into a stacker;
a second discharge unit configured to discharge a cut sheet generated by the cutting unit into a discharge tray, the discharge tray being a discharge destination different from the stacker; and
a control unit configured to, in a case where a jam of a cut sheet is occurred on the sheet conveyance path, determine whether the jammed cut sheet and a cut sheet preceding the jammed cut sheet have been generated from a same single sheet,
wherein the control unit is configured to, in a case where it is determined that the jammed cut sheet and the preceding cut sheet have not been generated from the same single sheet, perform control such that
a plurality of images including an image of the jammed cut sheet are re- printed on another single sheet by the print unit,
the re-printed single sheet is cut by the cutting unit, and
a plurality of cut sheets generated from the re-printed single sheet are discharged into the stacker by the first discharge unit,
wherein the control unit is configured to, in a case where it is determined that the jammed cut sheet and the preceding cut sheet have been generated from the same single sheet, perform control such that
an image of the jammed cut sheet is re-printed on another single sheet by the print unit,
the re-printed single sheet is cut by the cutting unit, and
one of a plurality of cut sheets, which is generated from the re- printed single sheet and includes a same image as the preceding sheet, is discharged into the discharge tray by the second discharge unit.

10. The printing system according to claim 9, wherein the control unit is configured to perform control such that another one of the plurality of cut sheets, which is generated from the re-printed single sheet and includes a same image as the jammed sheet, is discharged into the stacker by the first discharge unit.

11. The printing system according to claim 9, further comprising a finisher for performing stapling, punching, or bookbinding, which is located downstream from the cutting unit.

12. The printing system according to claim 9, wherein the cutting unit generates the plurality of cut sheets by equally dividing the single sheet of a standard size.

13. The printing system according to claim 9, wherein the cutting unit generates two cut sheets of A4-size by cutting one single sheet of A3-size.

14. The printing system according to claim 9, wherein the control unit starts re-printing an image of the jammed cut sheet after the jam is recovered.

15. A printing system, comprising:
a print unit configured to print a plurality of images on a single sheet;
a cutting unit configured to cut a single sheet on which a plurality of images have been printed by the print unit, thereby generating a plurality of cut sheet each including one of the plurality of images;
a conveyance unit configured to convey a plurality of cut sheet generated by the cutting unit along a sheet conveyance path;
a discharge unit configured to discharge a plurality of cut sheet conveyed along the sheet conveyance path;
a display unit; and
a control unit configured to, in a case where a jam of a cut sheet is occurred on the sheet conveyance path, determine whether the jammed cut sheet and a cut sheet preceding the jammed cut sheet have been generated from a same single sheet,
wherein the control unit is configured to, in a case where it is determined that the jammed cut sheet and the preceding cut sheet have been generated from the same single sheet, perform control such that
a plurality of images including an image of the preceding cut sheet and an image of the jammed cut sheet are re-printed on another single sheet,
the re-printed single sheet is cut by the cutting unit,
a plurality of cut sheets generated from the re-printed single sheet are discharged by the discharge unit, and
a notification is displayed by the display unit, the notification indicating that a sheet was printed in a redundant manner at the time of jam recovery and the redundantly printed sheet was discharged.

* * * * *